US011665692B2

(12) United States Patent
Farag et al.

(10) Patent No.: US 11,665,692 B2
(45) Date of Patent: May 30, 2023

(54) METHOD AND APPARATUS FOR BEAM INDICATION IN A MULTI-BEAM SYSTEM

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 17/148,517

(22) Filed: Jan. 13, 2021

(65) Prior Publication Data

US 2021/0227530 A1 Jul. 22, 2021

Related U.S. Application Data

(60) Provisional application No. 63/107,980, filed on Oct. 30, 2020, provisional application No. 63/086,969, (Continued)

(51) Int. Cl.
*H04W 4/00* (2018.01)
*H04W 72/20* (2023.01)

(52) U.S. Cl.
CPC ................... *H04W 72/20* (2023.01)

(58) Field of Classification Search
CPC . H04W 72/0406; H04W 28/04; H04W 72/04; H04W 72/042; H04W 88/08;
(Continued)

(56) References Cited

U.S. PATENT DOCUMENTS 10,764,896 B2 * 9/2020 Guo ..................... H04L 5/0053
10,856,316 B2 * 12/2020 Liou ................. H04W 72/1205
(Continued)

FOREIGN PATENT DOCUMENTS

KR 10-2019-0140965 A 12/2019
WO 2019/066618 A1 4/2019
(Continued)

OTHER PUBLICATIONS

"3rd Generation Partnership Project; Technical Specification Group Radio Access Network; NR; Physical channels and modulation (Release 16)", 3GPP TS 38.211 V16.4.0, Dec. 2020, 133 pgs.
(Continued)

*Primary Examiner* — Phuongchau Ba Nguyen

(57) ABSTRACT

An apparatus for beam management includes a transceiver configured to receive configuration information for one or more transmission configuration indicator (TCI) states and corresponding channels, receive one or more TCI state identifiers (IDs) on a channel for conveying TCI state IDs from among the corresponding channels, and transmit an acknowledgement message in response to the reception of the one or more TCI state IDs. The apparatus further includes a processor configured to determine, based on the one or more TCI state IDs, TCI states for data and control channels, respectively, from among the corresponding channels, and update spatial filters for the data and control channels based on the determined TCI states for the data channels and the control channels, respectively. The transceiver is further configured to receive the data channels and the control channels based on the updated spatial filters for the data and the control channels, respectively.

16 Claims, 15 Drawing Sheets

Related U.S. Application Data filed on Oct. 2, 2020, provisional application No. 62/961,858, filed on Jan. 16, 2020.

(58) Field of Classification Search
CPC ... H04L 5/0091; H04L 5/0023; H04L 5/0007; H04B 7/0695
See application file for complete search history.

(56) References Cited

U.S. PATENT DOCUMENTS

| | | | |
|---|---|---|---|
| 10,863,537 B2* | 12/2020 | Liou | H04W 72/1289 |
| 11,095,415 B2* | 8/2021 | Papasakellariou | H04L 5/001 |
| 11,115,973 B2* | 9/2021 | Jin | H04L 5/0096 |
| 11,343,735 B2* | 5/2022 | Cirik | H04W 36/305 |
| 2018/0343653 A1 | 11/2018 | Guo | |
| 2019/0215701 A1* | 7/2019 | Honglei | H04W 16/28 |
| 2019/0222289 A1 | 7/2019 | John Wilson et al. | |
| 2019/0297637 A1* | 9/2019 | Liou | H04W 72/1273 |
| 2019/0342907 A1* | 11/2019 | Huang | H04L 5/0048 |
| 2019/0349964 A1* | 11/2019 | Liou | H04W 72/046 |
| 2020/0068548 A1 | 2/2020 | Guan et al. | |
| 2020/0100311 A1* | 3/2020 | Cirik | H04B 7/0695 |
| 2020/0221485 A1* | 7/2020 | Cirik | H04L 5/10 |
| 2020/0267571 A1 | 8/2020 | Park et al. | |
| 2020/0358505 A1* | 11/2020 | Park | H04B 7/0456 |
| 2020/0359459 A1* | 11/2020 | Kakishima | H04W 72/0493 |
| 2021/0058805 A1* | 2/2021 | Ji | H04B 7/0695 |
| 2021/0105749 A1* | 4/2021 | Zhou | H04L 5/0091 |
| 2021/0227528 A1* | 7/2021 | Bang | H04W 72/1268 |
| 2021/0274503 A1* | 9/2021 | Farag | H04L 5/0094 |
| 2022/0015082 A1* | 1/2022 | Farag | H04W 72/14 |
| 2022/0124768 A1* | 4/2022 | Frenne | H04L 5/0048 |
| 2022/0132549 A1* | 4/2022 | Yu | H04W 72/1289 |
| 2022/0132550 A1* | 4/2022 | Yu | H04W 72/1273 |
| 2022/0167388 A1* | 5/2022 | Hu | H04L 1/1812 |
| 2022/0263616 A1* | 8/2022 | Farag | H04L 5/0051 |
| 2022/0271821 A1* | 8/2022 | Farag | H04L 5/0051 |
| 2022/0361211 A1* | 11/2022 | Karaki | H04L 1/1607 |

FOREIGN PATENT DOCUMENTS

| | | | |
|---|---|---|---|
| WO | 2019/097478 A1 | 5/2019 | |
| WO | 2019/143900 A1 | 7/2019 | |
| WO | WO-2022155198 A1 * | 7/2022 | H04B 7/088 |

OTHER PUBLICATIONS

"3rd Generation Partnership Project; Technical Specification Group Radio Access Network; NR; Multiplexing and channel coding (Release 16)", 3GPP TS 38.212 v16 4.0, Dec. 2020, 152 pgs.

"3rd Generation Partnership Project; Technical Specification Group Radio Access Network; NR; Physical layer procedures for control (Release 16)", 3GPP TS 38.213 v16 4.0, Dec. 2020, 181 pgs.

"3rd Generation Partnership Project; Technical Specification Group Radio Access Network; NR; Physical layer procedures for data (Release 16)", 3GPP TS 38.214 V16.4.0, Dec. 2020, 169 pgs.

"3rd Generation Partnership Project; Technical Specification Group Radio Access Network; NR; Medium Access Control (MAC) protocol specification (Release 16)", 3GPP TS 38.321 V16.3.0, Dec. 2020, 156 pgs.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

International Search Report dated Apr. 12, 2021 in connection with International Patent Application No. PCT/KR2021/000687, 4 pages.

Extended European Search Report dated Dec. 19, 2022 regarding Application No. 21740688.3, 15 pages.

Qualcomm Incorporated, "Multi-TRP Enhancements", 3GPP TSG-RAN WG1 Meeting #97, R1-1907289, May 2019, 25 pages.

\* cited by examiner

US 11,665,692 B2

METHOD AND APPARATUS FOR BEAM INDICATION IN A MULTI-BEAM SYSTEM

CROSS-REFERENCE TO RELATED APPLICATION(S) AND CLAIM OF PRIORITY

This application claims priority under 35 U.S.C. § 119(e) to U.S. Provisional patent Application No. 62/961,858 filed on Jan. 16, 2020, to U.S. Provisional Patent Application No. 63/086,969 filed on Oct. 2, 2020, and to U.S. Provisional Patent Application No. 63/107,980 filed on Oct. 30, 2020. The above-identified provisional patent applications are hereby incorporated by reference in their entirety.

TECHNICAL FIELD

This disclosure relates generally to beam indication in wireless communications systems. Embodiments of this disclosure relate to methods and apparatuses for indicating a beam for use by a communication device to communicate with a base station in a beamforming-capable wireless communications system.

BACKGROUND

Wireless communication has been one of the most successful innovations in modern history. Recently, the number of subscribers to wireless communication services exceeded five billion and continues to grow quickly. The demand for wireless data traffic is rapidly increasing due to the growing popularity among consumers and businesses of smart phones and other mobile data devices such as tablets, "note pad" computers, net books, eBook readers, and machine type of devices. In order to meet the high growth in mobile data traffic demand and support new applications and deployments, improvements in radio interface efficiency and coverage is of paramount importance.

SUMMARY

Embodiments of the present disclosure provide a method and an apparatus for.

In one embodiment, a user equipment (UE) is provided, comprising a transceiver and a processor. The transceiver is configured to receive configuration information for one or more transmission configuration indicator (TCI) states and corresponding channels, receive one or more TCI state identifiers (IDs) on a channel for conveying TCI state IDs from among the corresponding channels based on the configuration information, and transmit an acknowledgement message in response to the reception of the one or more TCI state IDs. The processor is operably connected to the transceiver and configured to determine, based on the one or more TCI state IDs, TCI states for data channels and control channels, respectively, from among the corresponding channels, and update spatial filters for the data and control channels based on the determined TCI states for the data channels and the control channels, respectively. The transceiver is further configured to receive the data channels and the control channels based on the updated spatial filters for the data channels and the control channels, respectively.

In another embodiment, a base station (BS) is provided, comprising a transceiver and a processor. The transceiver is configured to transmit configuration information for one or more transmission configuration indicator (TCI) states and corresponding channels, transmit one or more TCI state identifiers (IDs) on a channel for conveying TCI state IDs from among the corresponding channels based on the configuration information, and receive an acknowledgement message in response to the transmission of the one or more TCI state IDs. The processor is operably connected to the transceiver and configured to generate the one or more TCI state IDs such that the one or more TCI state IDs indicate TCI states for data channels and control channels, respectively, from among the corresponding channels, and update one or more spatial filters for the data channels and control channels based on the indicated TCI states for the data channels and the control channels, respectively. The transceiver is further configured to transmit the data channels and the control channels based on the updated spatial filters for the data channels and the control channels, respectively.

In another embodiment, a method of a UE is provided, including the steps of receiving configuration information for one or more transmission configuration indicator (TCI) states and corresponding channels, receiving one or more TCI state identifiers (IDs) on a channel for conveying TCI state IDs from among the corresponding channels based on the configuration information, transmitting an acknowledgement message in response to the reception of the one or more TCI state IDs, determining, based on the one or more TCI state IDs, one or more spatial filters for the data channels and control channels based on TCI determined states for data channels and control channels, respectively, from among the corresponding channels, updating the TCI states for the data channels and the control channels, respectively, and receiving the data channels and the control channels based on the updated one or more spatial filters for the data channels and the control channels, respectively.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] 3GPP TS 38.211 v16.4.0, "NR; Physical channels and modulation."

[2] 3GPP TS 38.212 v16.4.0, "NR; Multiplexing and Channel coding."

[3] 3GPP TS 38.213 v16.4.0, "NR; Physical Layer Procedures for Control."

[4] 3GPP TS 38.214 v16.4.0, "NR; Physical Layer Procedures for Data."

[5] 3GPP TS 38.321 v16.3.0, "NR; Medium Access Control (MAC) protocol specification."

[6] 3GPP TS 38.331 v16.3.1, "NR; Radio Resource Control (RRC) Protocol Specification."

Abbreviations

ACK Acknowledgement
BW Bandwidth
BWP Bandwidth Part
CORESET Control Resource Set
C-RNTI Cell RNTI
CSI Channel State Information
CSI-RS Channel State Information Reference Signal
DCI Downlink Control Information
DL Downlink
DMRS Demodulation Reference Signal
gNB Base Station
HARQ Hybrid ARQ
MCS Modulation and Coding Scheme
NR New Radio
PBCH Primary Broadcast Channel
PCell Primary Cell
PDCCH Physical Downlink Control Channel
PDSCH Physical Downlink Shared Channel
PUCCH Physical Uplink Control Channel
PUSCH Physical Uplink Shared Channel
RB Resource Block
RNTI Radio Network Temporary Identifier
RS Reference Signal
SCell Secondary Cell
SINR Signal to Interference and Noise Ratio
SRS Sounding Reference Signal
SS Synchronization Signals
TB Transport Block
TDD Time Division Duplexing
TPC Transmit Power Control
UCI Uplink Control Information
UE User Equipment
UL Uplink In this disclosure, the term "activation" describes an operation wherein a UE receives and decodes a signal from a network or gNodeB (gNB) that signifies a starting point in time. The starting point can be a present or a future time slot, subframe, or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network or gNB that signifies a stopping point in time. The stopping point can be a present or a future slot, subframe, or symbol—the exact location either implicitly or explicitly indicated, or otherwise fixed or higher-layer configured. Upon successfully decoding the signal, the UE responds accordingly.

In this disclosure, terminology such as transmission configuration indicator (TCI), TCI states, TCI state identifier (ID), SpatialRelationInfo, target RS, reference RS, and other terms are used for illustrative purposes and therefore are not normative. Other terms that refer to the same functions can also be used.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its advantages, reference is now made to the following description taken in conjunction with the accompanying drawings, in which like reference numerals represent like parts.

DETAILED DESCRIPTION

Figure 1:
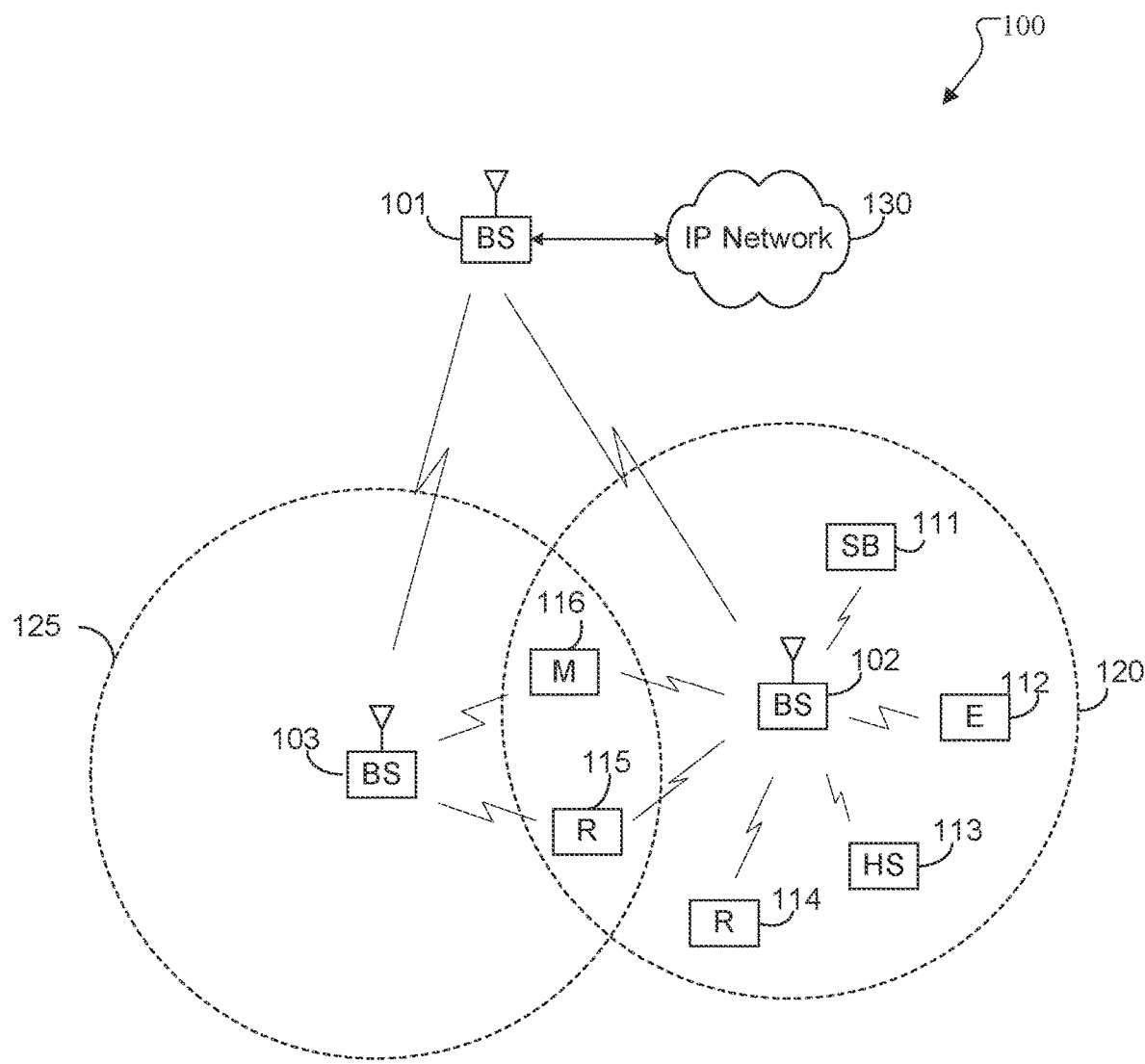
FIG. 1 illustrates an example wireless network, which transmits signals according to the principles of the present disclosure.

FIGS. 1 through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that in a mobile wireless system, as a UE moves around or rotates, beam management procedures can enable a network (NW), base station (e.g., a gNB), or UE to measure, report, indicate and utilize new suitable beams to communicate on. One aspect of beam management is "beam indication," where a gNB conveys, to a UE, any suitable parameter or field that allows the gNB to indicate to the UE an assigned beam for the UE. One suitable parameter or field for beam indication is a transmission configuration indicator (TCI), such as a DL-TCI, UL-TCI, joint-TCI (which couples DL and UL beam indications either partially or fully). Another suitable parameter or field is an SRS resource indicator (SRI). Embodiments of the present disclosure provide enhancements to beam indication.

For simplicity, embodiments of this disclosure related to DL communications are referring to communications from a gNB to a UE that is served by the gNB, and embodiments of this disclosure related to UL communications are referring to communications from the UE to the gNB. It is understood, however, that embodiments of this disclosure could be used with any suitable devices, and embodiments of this disclosure related to DL and UL could refer to communications from any suitable device to any other suitable device.

For the purposes of this disclosure, a beam used for transmission or reception of DL or UL channels prior to beam indication is called an "old beam" or "current beam". A beam used for transmission or reception upcoming DL or UL channels after a beam indication is called a "new beam". The gNB indicates (or conveys) a new beam to a UE using DL-related DCI (that carries a DL grant, such as DCI format 1_1 in NR), UL-related DCI (that carries a UL grant, such as DCI format 0_1 in NR), a purpose-designed DL channel for beam indication that can be UE-specific or for a group of UEs, or a MAC control element (CE). The channel conveying that beam indication is referred to as a "TCI channel", but this doesn't limit a channel to just conveying a TCI, as it can also, or instead, convey the SRI and other fields. A beam used by the channel that conveys the beam indication is called a "TCI channel beam" or a channel for conveying TCI state. A "TCI state" refers to information that characterizes a beam (e.g., information that characterizes the width and direction of a beam, or that defines a spatial filter corresponding to the beam). Because a TCI state characterizes a given beam in a system, "TCI state" may also be used to refer to the beam itself, or to an identifier of the beam from among a list of pre-configured TCI states (e.g., a list of beam hypotheses) associated with a device. Additionally, a TCI can indicate a TCI state, and accordingly the TCI can also be referred to as a TCI state identifier (ID).

A TCI channel is transmitted after a gNB has determined that channel conditions warrant using a new beam. As transmission of the beam indication is a result of a change in channel conditions, using a beam indication mechanism/channel with a suitably designed beam (e.g., a suitably designed TCI channel beam) ensures that the beam indication for a new beam is successfully received by the UE. More specifically, using an "old beam" for a TCI channel beam might not guarantee that the TCI channel is received by a UE, as the UE could be outside the coverage of the old beam. Using a "new beam" for a TCI channel beam also might not guarantee that the TCI channel is received by a UE, as the UE is not aware of the new beam prior to the reception of the TCI channel. Accordingly, embodiments of this disclosure address aspects of a TCI channel beam that enhance the reception of the TCI channel.

Embodiments of the present disclosure also recognize that a TCI channel can convey beam indications for a single UE (referred to as a UE-specific TCI channel or beam indication channel) or for a group of UEs (referred to as a UE-group TCI channel or beam indication channel).

Embodiments of the present disclosure further recognize that the timing of applying a new beam for transmitting or receiving a channel after receiving a beam indication for that channel—in other words, the timing of updating the TCI state for a channel after receiving a TCI (or TCI state ID) indicating the new TCI state for the channel—is important to ensure reception of the channel. If the transmitter and the receiver do not align the timing of their respective updates to the TCI state, then transmission of the channel may fail because the receiver may not be monitoring the correct beam. Accordingly, embodiments of the present disclosure provide improvements related to the alignment of the timing of the application of a new beam at a gNB and at the UE, in order to ensure beam alignment between a gNB and a UE.

Embodiments of the present disclosure additionally recognize that to facilitate fast beam management it is desirable to streamline the foundational components for beam management. One key functionality of beam management is beam selection, which comprises foundational components such as beam measurement (including training), reporting (for DL beam management, reporting via UL control channel(s)), and indication (for DL and UL beam management, indication via DL control channel(s)). Once the foundational components are streamlined, additional features to facilitate faster beam management can be added. In some embodiments, a "slim mode" with streamlined designs of such foundational components can be used for fast beam management. The slim mode design, due to its compact nature, can facilitate faster updating or reconfiguration via lower-layer control signaling. That is, L1 control signaling is the primary signaling mechanism and higher-layer signaling (such as MAC CE or RRC) is used only when necessary. Here, L1 control signaling includes the use of UE-group DCI as well as dedicated (UE-specific) DCI.

FIG. 1 illustrates an example wireless network 100, which transmits signals according to the principles of the present disclosure. In the illustrated embodiment, wireless network 100 includes a next generation NodeB (gNodeB or gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" (BS) or "access point" (AP). For the sake of convenience, the terms "gNodeB" and "gNB" are used in this disclosure to refer to network infrastructure components that provide wireless access to remote terminals. Also, depending on the network type, other well-known terms may be used instead of "user equipment" (UE), such as "mobile station," "subscriber station," "remote terminal," "wireless terminal," or "user device." For the sake of convenience, the terms "user equipment" and "UE" are used in this disclosure to refer to remote wireless equipment that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, 4G long-term evolution (LTE), 4G LTE Advanced (LTE-A), Worldwide Interoperability for Microwave Access (WiMAX), or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include 2D antenna arrays in accordance with embodiments of the present disclosure. In some embodiments, one or more of gNB 101, gNB 102 and gNB 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 101-103 can communicate directly with the network 130 and provide UEs with direct wireless broadband access to the network 130. Furthermore, the gNBs 101-103 can provide access to other or additional external networks, such as external telephone networks or other types of data networks.

Figure 2:
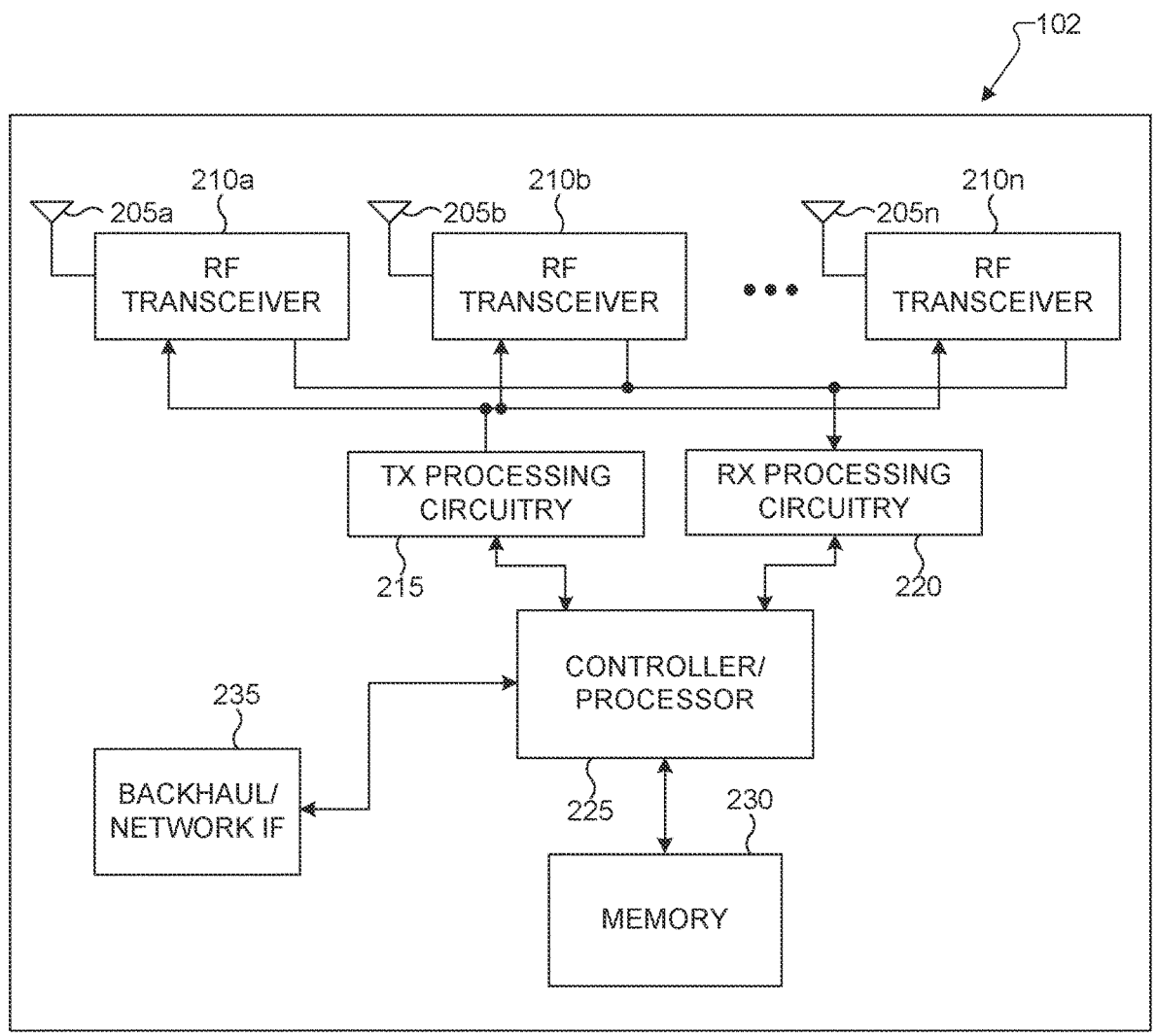
FIG. 2 illustrates an example gNodeB (gNB) according to embodiments of the present disclosure.

FIG. 2 illustrates an example gNB 102 according to embodiments of the present disclosure. The embodiment of the gNB 102 illustrated in FIG. 2 is for illustration only, and the gNB 102 of FIG. 1 could have the same or similar configuration. However, gNBs come in a wide variety of configurations, and FIG. 2 does not limit the scope of this disclosure to any particular implementation of a gNB. It is noted that gNB 101 and gNB 103 can include the same or similar structure as gNB 102.

As shown in FIG. 2, the gNB 102 includes multiple antennas 205a-205n, multiple RF transceivers 210a-210n, transmit (TX) processing circuitry 215, and receive (RX) processing circuitry 220. In some embodiments, one or more of the multiple antennas 205a-205n include 2D antenna arrays. The gNB 102 also includes a controller/processor 225, a memory 230, and a backhaul or network interface 235.

The RF transceivers 210a-210n receive, from the antennas 205a-205n, incoming RF signals, such as signals transmitted by UE 116 or other UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-convert the baseband or IF signals to outgoing RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an operating system (OS). The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a random access memory (RAM), and another part of the memory 230 could include a Flash memory or other read-only memory (ROM).

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
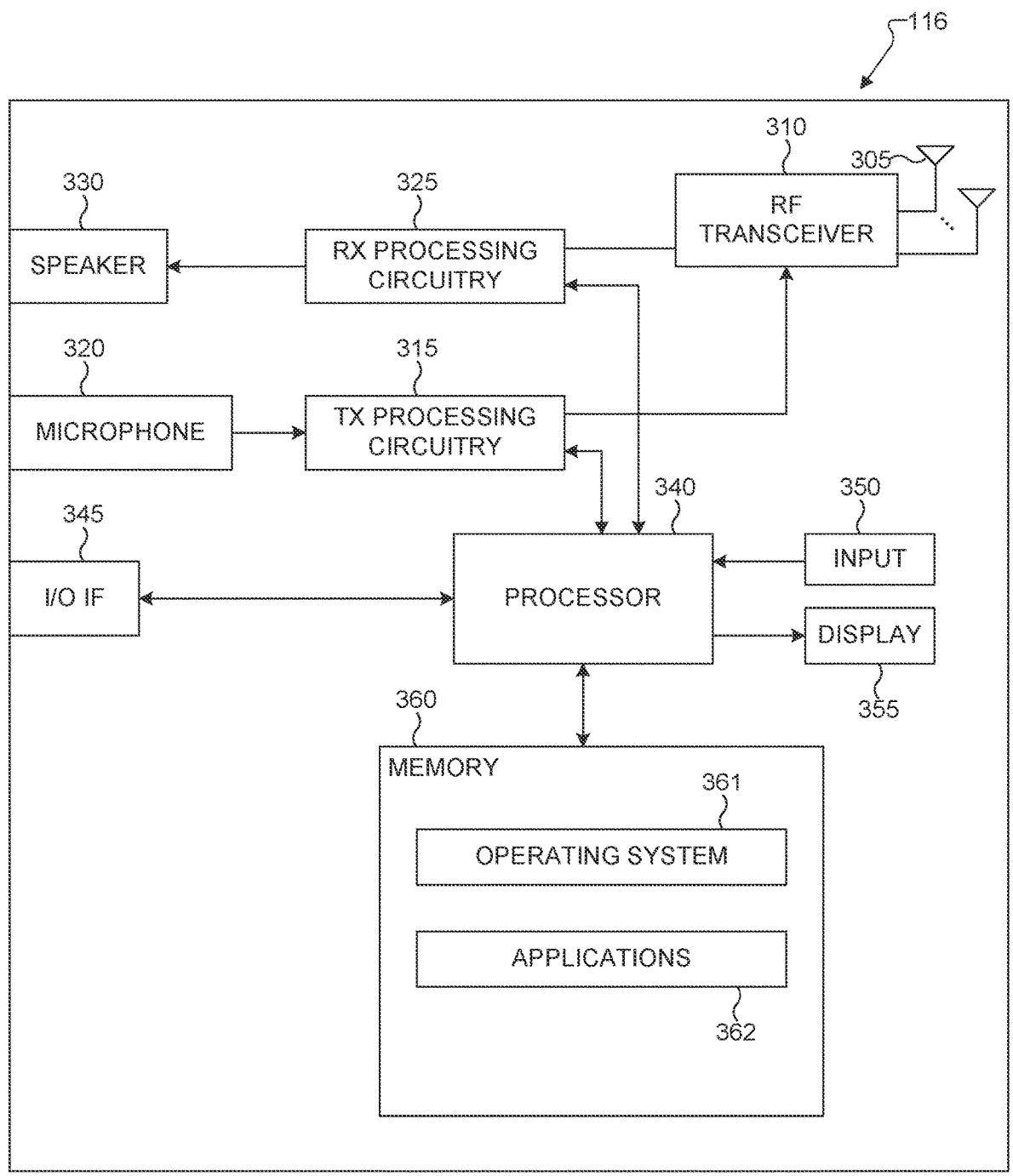
FIG. 3 illustrates an example user equipment (UE) according to embodiments of the present disclosure.

FIG. 3 illustrates an example UE 116 according to embodiments of the present disclosure. The embodiment of the UE 116 illustrated in FIG. 3 is for illustration only, and the UE 116 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. In some embodiments, the antenna 305 is a 2D antenna array. The UE 116 also includes a speaker 330, a processor 340, an input/output interface (I/O IF) 345, a touchscreen 350, a display 355, and a memory 360. The memory 360 includes an OS 361 and one or more applications 362.

The RF transceiver 310 receives, from the antenna 305, an incoming RF signal transmitted by a gNB, such as gNB 102, of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an outgoing RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for channel quality measurement and reporting for systems having 2D antenna arrays as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

Figure 4:
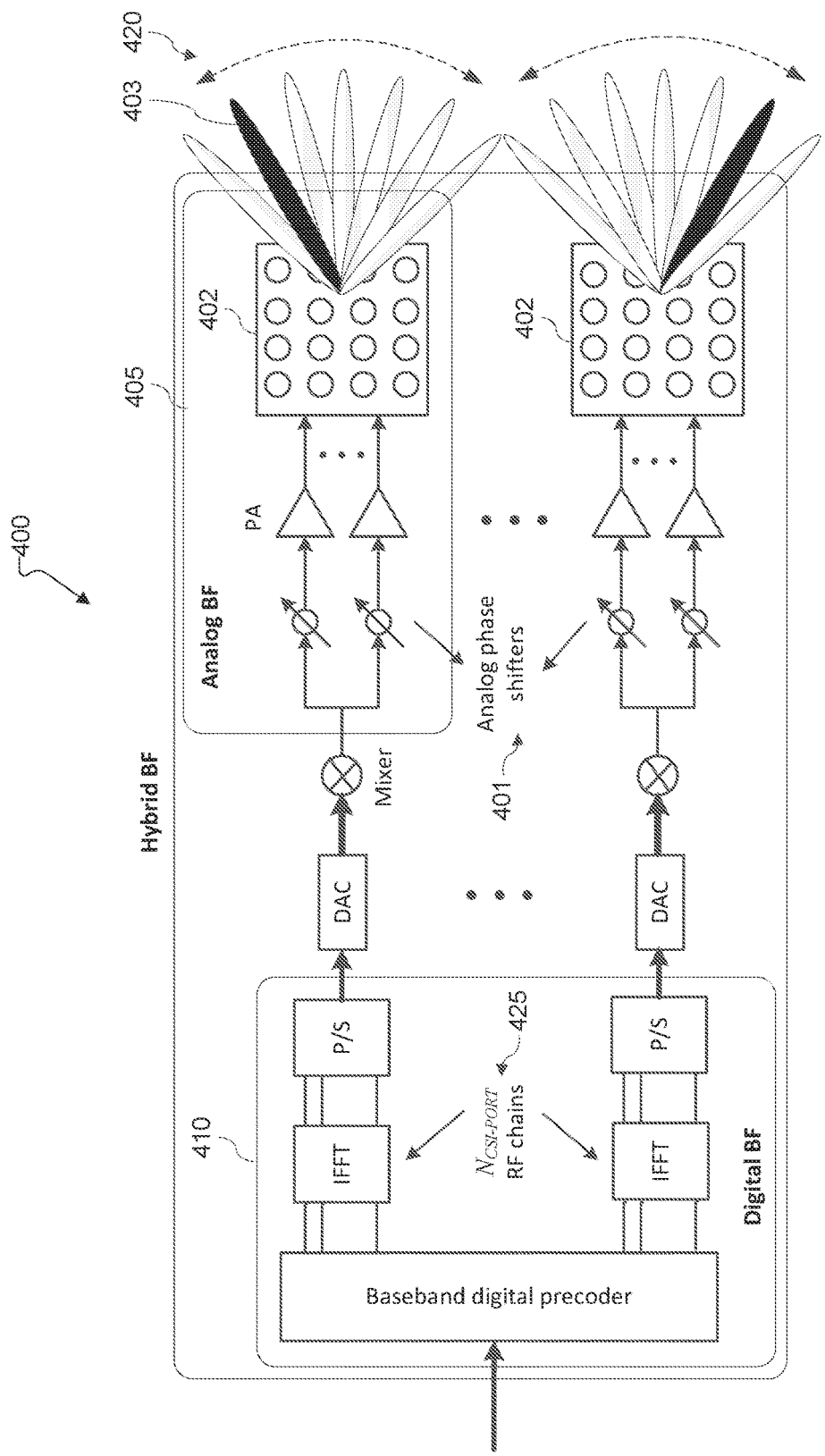
FIG. 4 illustrates a block diagram of example hybrid beamforming (BF) hardware according to embodiments of the present disclosure.

FIG. 4 illustrates a block diagram of example hybrid beamforming (BF) hardware 400 according to embodiments of the present disclosure. For the purposes of this disclosure, the hybrid BF hardware 400 is implemented in the gNB 102 of FIGS. 1 and 2, however it is understood that any other beamforming-capable wireless communication device of wireless network 100, such as the UE 116, could include hybrid BF hardware 400.

3GPP Release 14 LTE and 3GPP Release 15 NR support up to 32 CSI-RS antenna ports, which enables a wireless communication device to be equipped with a large number of antenna elements (e.g., 64 or 128 antenna elements). In such cases, a plurality of antenna elements is mapped onto one CSI-RS port.

By contrast, for mmWave band devices, although the number of antenna elements can be large for a given form factor, the number of CSI-RS ports—which can correspond to the number of digitally precoded ports—tends to be limited due to hardware constraints (such as the feasibility of installing a large number of ADCs or DACs at mmWave frequencies) as illustrated in FIG. 4.

In such an embodiment, one CSI-RS port is mapped onto a large number of antenna elements which can be controlled by a bank of analog phase shifters 401. One CSI-RS port can then correspond to one antenna sub-array 402 which produces a narrow analog beam 403 through analog beamforming 405. This analog beam can be configured to sweep across a wide range of angles 420 by varying the bank of analog phase shifters 401 across symbols or subframes. The number of antenna sub-arrays (equal to the number of RF chains 425) is the same as the number of CSI-RS ports $N_{CSI-PORT}$.

A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be designed analogously.

Although FIG. 4 illustrates one example of hybrid BF hardware 400, various changes may be made to FIG. 4. For example, various components in FIG. 4 could be combined, further subdivided, or omitted and additional components could be added according to particular needs.

Since the system of FIG. 4 utilizes multiple analog beams for transmission and reception (wherein one or a small number of analog beams are selected out of a large number, for instance, after a training duration—to be performed from time to time), the term "multi-beam operation" is used to refer to the overall system operation.

The system of FIG. 4 is also applicable to higher frequency bands such as >52.6 GHz (also termed the FR4). In such embodiments, the system can employ only analog beams. Due to the oxygen absorption loss around 60 GHz frequency (approximately 10 dB additional loss at 100 m distance), a larger number of, and sharper, analog beams (hence a larger number of radiators in the antenna array) will be needed to compensate for the additional path loss.

Figure 5A:
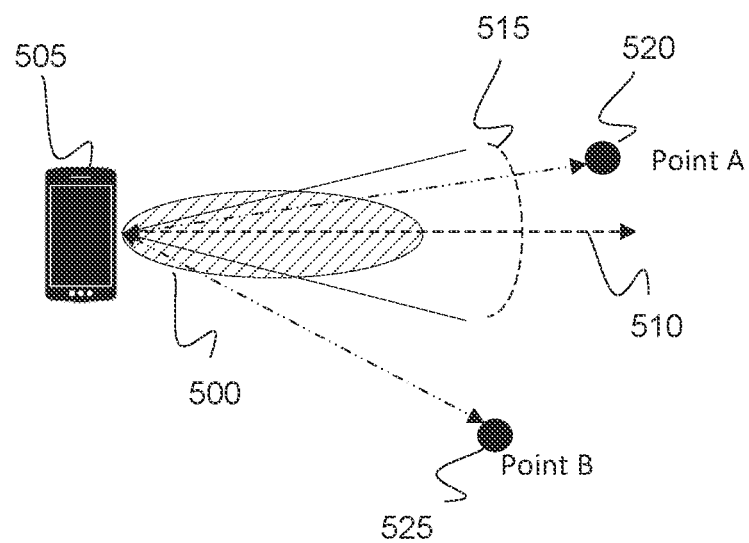
FIGS. 5A and 5B illustrate diagrams of beam operations according to embodiments of the present disclosure.
Figure 5B:
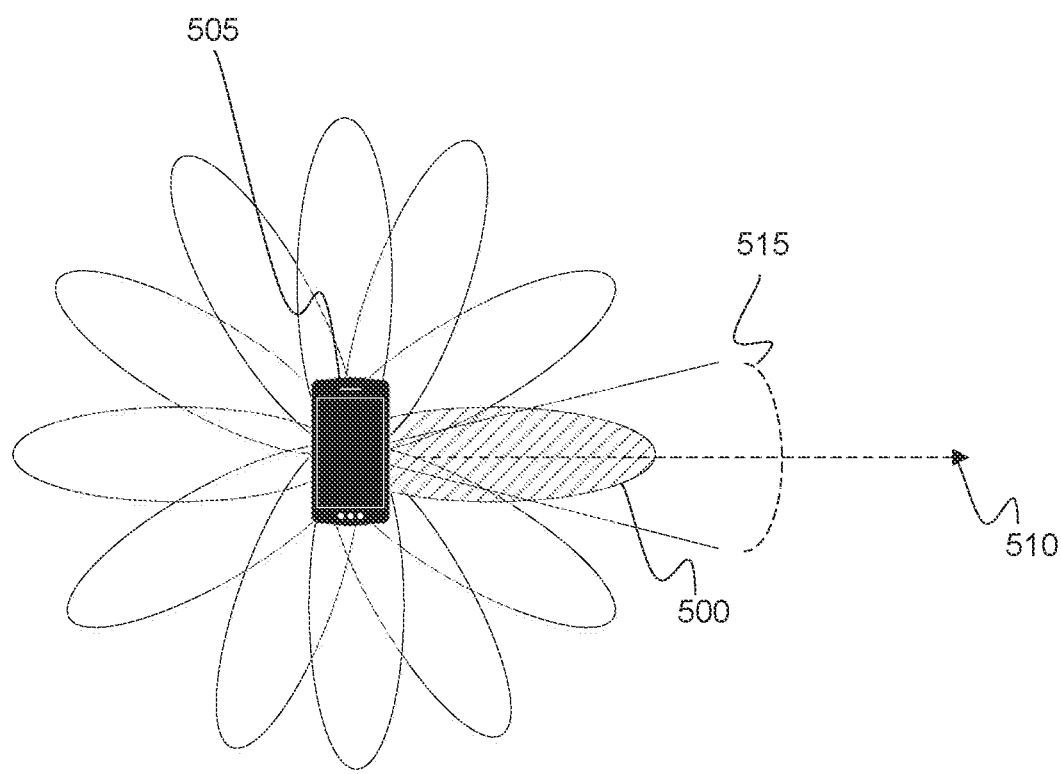

FIGS. 5A and 5B illustrate diagrams of beam operations according to embodiments of the present disclosure. For the purposes of this disclosure, the diagrams of FIGS. 5A and 5B represent operation of wireless communication devices, such as gNB 102 and UE 116, in a wireless network 100. It is understood that the illustrated beam operations could apply to any similar wireless communication devices in any suitable wireless communication system.

As illustrated in FIG. 5A, in a wireless system a beam 500 for a wireless communication device 505 (e.g., a gNB 102 or a UE 116) can be characterized by a beam direction 510 and a beam width 515. For example, a device 505 with a transmitter transmits radio frequency (RF) energy in beam direction 510 and within a beam width 515. A device 505 with a receiver receives RF energy coming towards the device 505 in beam direction 510 and within beam width 515.

A device located at point A (520) can receive from and transmit to device 505 as Point A is within beam width 515 of a beam 500 traveling in beam direction 510 and transmitted from device 505. However, a device at point B (525) cannot receive from and transmit to device 505 as Point B is outside of the beam width 515 of the beam 500 traveling in beam direction 510 and transmitted from device 505. While FIG. 5A, for illustrative purposes, shows a beam 500 in 2 dimensions (2D), it should be apparent to those skilled in the art that a beam can be defined in 3 dimensions (3D), where the beam direction 510 and beam width 515 are defined in 3D space.

In a wireless system, a device such as device 505 can transmit or receive on multiple beams. This is known as "multi-beam operation" and is illustrated in FIG. 5B. While FIG. 5B, for illustrative purposes, is in 2D, it should be apparent to those skilled in the art that a beam can be 3D, where a beam can be transmitted to or received from any direction in 3D space.

Multi-beam operation includes, for the purpose of illustration, indicating an assigned DL or UL transmit (TX) beam (i.e., beam indication), measuring at least one reference signal for calculating and performing beam reporting (also termed "beam measurement" and "beam reporting", respectively), and receiving a DL or UL transmission via selection of a corresponding receive (RX) beam.

In 3GPP Release 15 NR, multi-beam operation is designed primarily for single transmit-receive point (TRP) and single antenna panel systems. Therefore, Release 15 NR supports beam indication for one TX beam, wherein a TX beam is associated with a reference RS. For DL beam indication and measurement, the reference RS can be a non-zero power (NZP) CSI-RS or an SSB (synchronization signal block, which includes primary synchronization signal, secondary synchronization signal, and PBCH). In such an embodiment, DL beam indication is done via a TCI field in DL-related DCI which includes an index to one (and only one) assigned reference RS. A set of beam hypotheses, or "TCI states," is configured via higher-layer signaling (e.g., RRC signaling) and, when applicable, a subset of those TCI states is selected (or activated) via a MAC control element (MAC CE) based on the TCI field code points. For UL beam indication and measurement in such an embodiment, the reference RS can be an NZP CSI-RS, SSB, or SRS. UL beam indication is done via the SRI field in UL-related DCI which is linked to one (and only one) reference RS. This linkage is configured via higher-layer signaling (e.g., RRC signaling) using the SpatialRelationInfo RRC parameter. Essentially, only one TX beam is indicated to the UE.

A "reference RS" corresponds to a set of characteristics of a DL or UL TX beam, such as direction, precoding/beamforming, number of ports, etc. For instance, for DL, as the UE receives a reference RS index/ID in a DL assignment represented by a TCI state, the UE applies the known characteristics of the reference RS to the assigned DL transmission. The reference RS can be received and measured by the UE (in this case, the reference RS is a downlink signal such as an NZP CSI-RS or SSB) with the result of the measurement used for calculating a beam report (in Release 15 NR, at least one L1-RSRP accompanied by at least one CRI). As the gNB receives the beam report, the NW can be better equipped with information to assign a particular DL TX beam to the UE. Optionally, the reference RS can be transmitted by the UE (in this case, the reference RS is an uplink signal such as an SRS). As the gNB receives the reference RS, the gNB can measure and calculate the needed information to assign a particular DL TX beam to the UE. This option is applicable when DL-UL beam pair correspondence holds.

In another instance, for UL, as the UE receives a reference RS index/ID in a UL grant, the UE applies the known characteristics of the reference RS to the granted UL transmission. The reference RS can be received and measured by the UE (in this case, the reference RS is a downlink signal such as an NZP CSI-RS or SSB) with the result of the measurement used for calculating a beam report. As the gNB receives the beam report, the NW can be better equipped with information to assign a particular UL TX beam to the UE. This option is applicable when DL-UL beam pair correspondence holds. Optionally, the reference RS can be transmitted by the UE (in this case, the reference RS is an uplink signal such as an SRS or DMRS). As the gNB receives the reference RS, the gNB can measure and calculate the needed information to assign a particular UL TX beam to the UE.

The reference RS can be dynamically triggered by the gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

For mmWave (or FR2) or higher frequency bands (such as >52.6 GHz, or FR4) where multi-beam operation is especially relevant, the transmission-reception process includes the receiver selecting a receive (RX) beam for a given TX beam. FIGS. 6A-6D below illustrate examples of this selection process for DL multi-beam operations and UL multi-beam operations. The example operations of FIGS. 6A-6D illustrate beam selection for communication between a gNB and a UE using the selected beams, and are discussed from the point of view of a gNB 102 and UE 116 for simplicity, but it is understood that any suitable devices could be used. It is also understood that a device such as a gNB can perform the operations of FIGS. 6A-6D for a plurality of devices such as UEs such that each of the plurality of UEs communicate with the gNB using different beams.

In general, for DL multi-beam operation, the UE selects a DL RX beam for every DL TX beam (which corresponds to a reference RS) that the UE expects to receive from the gNB. When a DL RS (such as CSI-RS or SSB) is used as the reference RS, the gNB transmits the DL RS to the UE (which is associated with a selection of a DL TX beam). In response, the UE measures the DL RS (and in the process selects a DL RX beam) and reports the beam metric associated with the quality of the DL RS. In this case, the UE determines the TX-RX beam pair for every configured (DL) reference RS. Therefore, although this knowledge is unavailable to the gNB, the UE—upon receiving a DL RS (and hence a DL TX beam) indication from the gNB—can select the DL RX beam from the knowledge of all the TX-RX beam pairs.

When a UL RS (such as SRS or DMRS) is used as the reference RS (pertinent when DL-UL beam correspondence or reciprocity holds), the gNB triggers or configures the UE to transmit the UL RS (for DL, and by reciprocity this corresponds to a DL RX beam). The gNB, upon receiving and measuring the UL RS, selects a DL TX beam. As a result, a TX-RX beam pair is derived. The gNB can perform this operation for all the configured UL RSs (either per reference RS or by "beam sweeping") and determine all the TX-RX beam pairs associated with all the UL RSs configured to the UE.

Figure 6A:
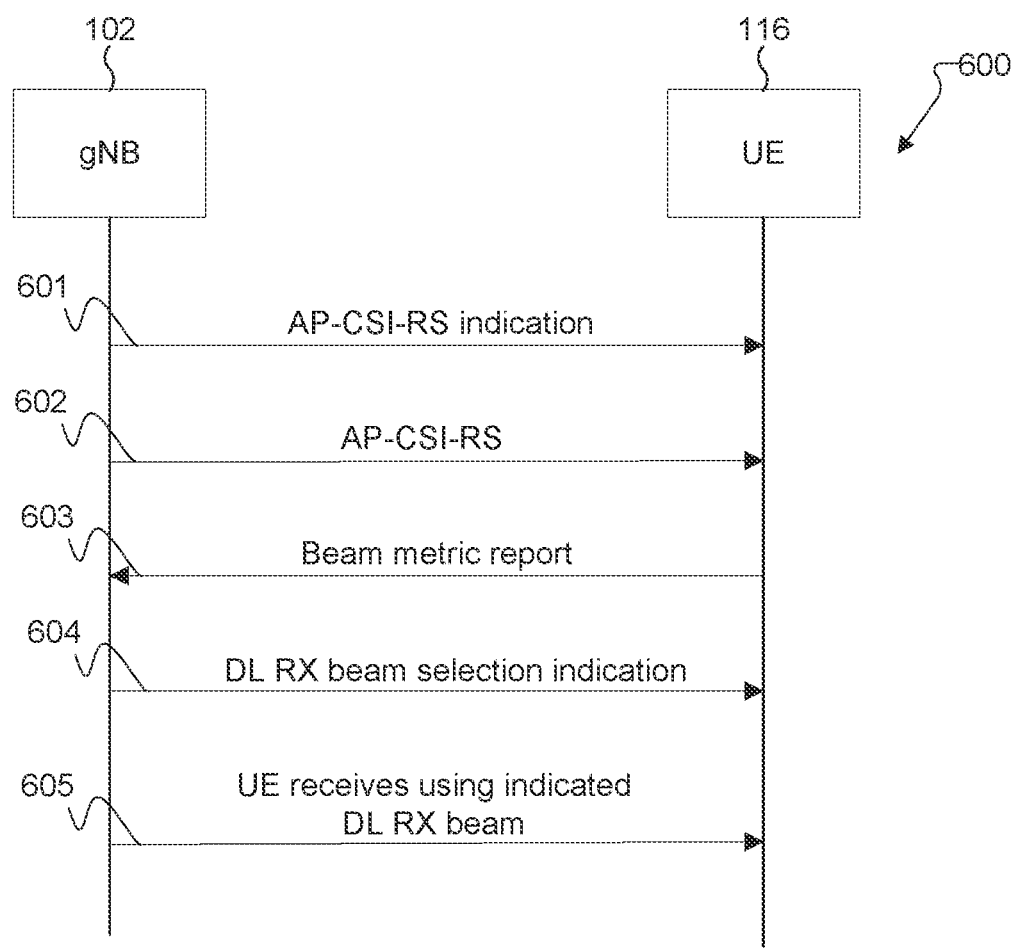
FIGS. 6A and 6B illustrate examples of DL multi-beam operations according to embodiments of the present disclosure.
Figure 6B:
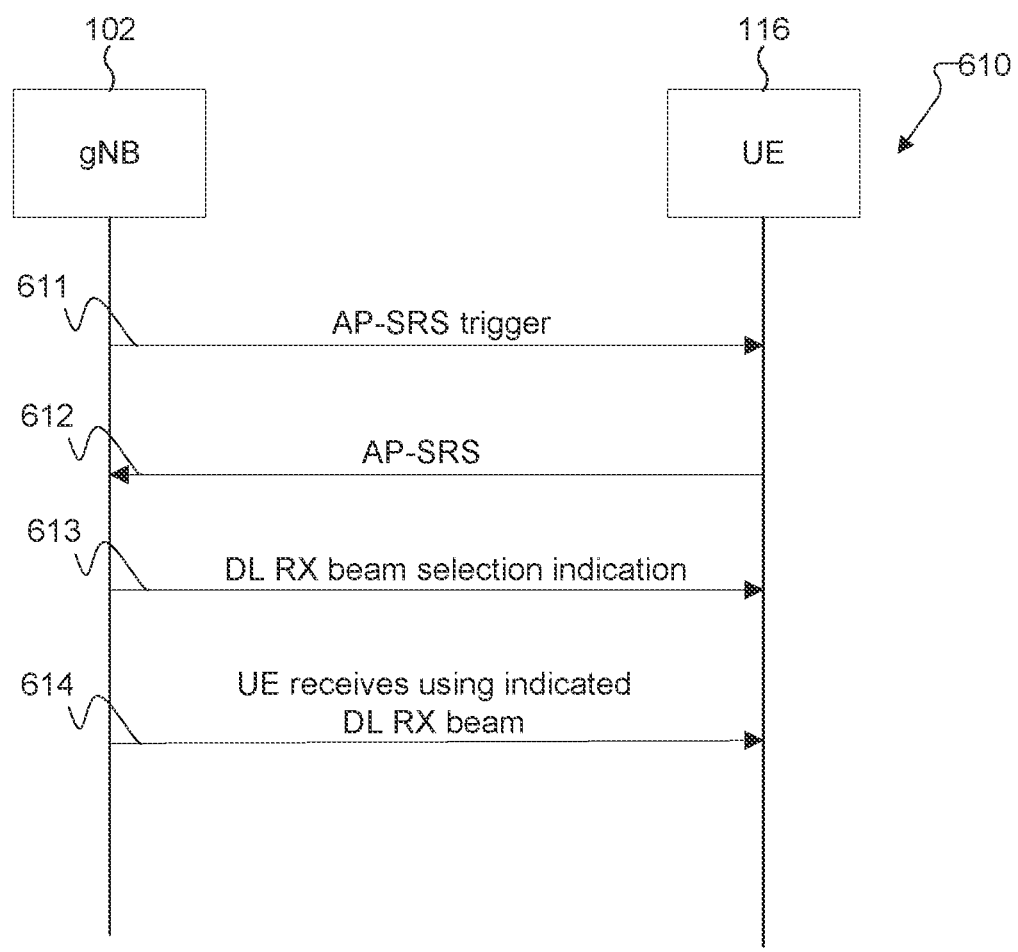

FIGS. 6A and 6B illustrate examples of DL multi-beam operations according to embodiments of the present disclosure. The examples of FIGS. 6A and 6B utilize DL-TCI-based DL beam indication. In the embodiment of FIG. 6A, aperiodic CSI-RS is transmitted by the gNB and measured by the UE. This embodiment can be used whether UL-DL beam correspondence holds or not (where "UL-DL beam correspondence" refers to the condition when between the UL and DL beam-pair-link (BPL) holds). In the embodiment of FIG. 6B, aperiodic SRS is triggered by the gNB and transmitted by the UE so that the gNB can measure the UL channel quality for the purpose of assigning a DL RX beam. This embodiment can be used when UL-DL beam correspondence holds. Although aperiodic RS is used in these two examples, periodic or semi-persistent RS can also be used.

With respect to FIG. 6A, a DL multi-beam operation 600 starts with the gNB signaling to a UE an aperiodic CSI-RS (AP-CSI-RS) trigger or indication (step 601). This trigger or indication can be included in a DCI (either UL-related or DL-related, either separately or jointly signaled with an aperiodic CSI request/trigger) and indicate transmission of AP-CSI-RS in a same (zero time offset) or later (>0 time offset) slot or sub-frame. Upon receiving the AP-CSI-RS transmitted by the gNB (step 602), the UE measures the AP-CSI-RS and, in turn, calculates and reports a "beam metric" (indicating quality of a particular TX beam hypothesis) (step 603). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB can use the beam report to select a DL RX beam for the UE and indicate the DL RX beam selection (step 604) using the DL-TCI field in the DL-related DCI (that carries the DL grant, such as DCI format 1_1 in NR). In this case, the DL-TCI indicates a reference RS (in this case, an AP-CSI-RS) representing the DL TX beam selected by the gNB. In addition, the DL-TCI can also indicate a "target" RS (e.g. CSI-RS) that is linked to the reference RS (in this case, an AP-CSI-RS). Upon successfully decoding the DL-related DCI with the DL-TCI, the UE selects a DL RX beam and performs DL reception (such as data reception via PDSCH) with the DL RX beam associated with the reference CSI-RS (step 605).

In alternative embodiments, the gNB can use the beam report to select a DL RX beam for the UE and indicate the DL RX beam selection (step 604) using a DL-TCI field for the UE in a purpose-designed DL channel for beam indication. A purpose-designed DL channel for beam indication can be UE-specific or for a group of UEs. In this case, the DL-TCI indicates a reference RS (in this case, an AP-CSI-RS) representing the DL TX beam selected by the gNB. In addition, the DL-TCI can also indicate a "target" RS (e.g. CSI-RS) that is linked to the reference RS (in this case, an AP-CSI-RS). Upon successfully decoding the purpose-designed DL channel for beam indication with the DL-TCI, the UE selects a DL RX beam and performs DL reception (such as data reception via PDSCH) with the DL RX beam associated with the reference CSI-RS (step 605).

For the embodiments of FIG. 6A, as described above, the UE selects the DL RX beam from the reference RS (in this case AP-CSI-RS) index signaled via the DL-TCI field. In this case, the CSI-RS resources (or, in general, the DL RS resources including CSI-RS, SSB, or a combination of the two) configured for the UE as the reference RS resources can be linked to (or associated with) "beam metric" reporting such as CRI/L1-RSRP or L1-SINR.

With respect to FIG. 6B, a DL multi-beam operation 610 starts with the gNB signaling to a UE an aperiodic SRS (AP-SRS) trigger or request (step 611). This trigger can be included in a DCI (either UL-related or DL-related). Upon receiving and decoding the AP-SRS trigger, the UE transmits an AP-SRS to the gNB (step 612) so that the gNB can measure the UL propagation channel and select a DL RX beam for the UE for DL, assuming beam correspondence holds.

The gNB can then indicate the DL RX beam selection (step 613) using the DL-TCI field in the DL-related DCI (that carries the DL grant, such as DCI format 1_1 in NR). In this case, the DL-TCI indicates a reference RS (in this case, an AP-SRS) representing the selected DL RX beam. In addition, the DL-TCI can also indicate a "target" RS (e.g. CSI-RS) that is linked to the reference RS (in this case, an AP-SRS). Upon successfully decoding the DL-related DCI with the DL-TCI, the UE performs DL reception (such as data reception via PDSCH) with the DL RX beam indicated by the DL-TCI (step 614).

In alternative embodiments, the gNB can indicate the DL RX beam selection (step 613) using a DL-TCI field for the UE in a purpose-designed DL channel for beam indication. A purpose-designed DL channel for beam indication can be UE-specific or for a group of UEs. In this case, the DL-TCI indicates a reference RS (in this case, an AP-SRS) representing the selected DL RX beam. In addition, the DL-TCI can also indicate a "target" RS (e.g. CSI-RS) that is linked to the reference RS (in this case, an AP-SRS). Upon successfully decoding a purpose-designed DL channel for beam indication with the DL-TCI, the UE performs DL reception (such as data reception via PDSCH) with the DL RX beam indicated by the DL-TCI (step 614).

For the embodiments of FIG. 6B, as described above, the UE selects the DL RX beam based on the UL TX beam associated with the reference RS (AP-SRS) index signaled via the DL-TCI field.

Figure 6C:
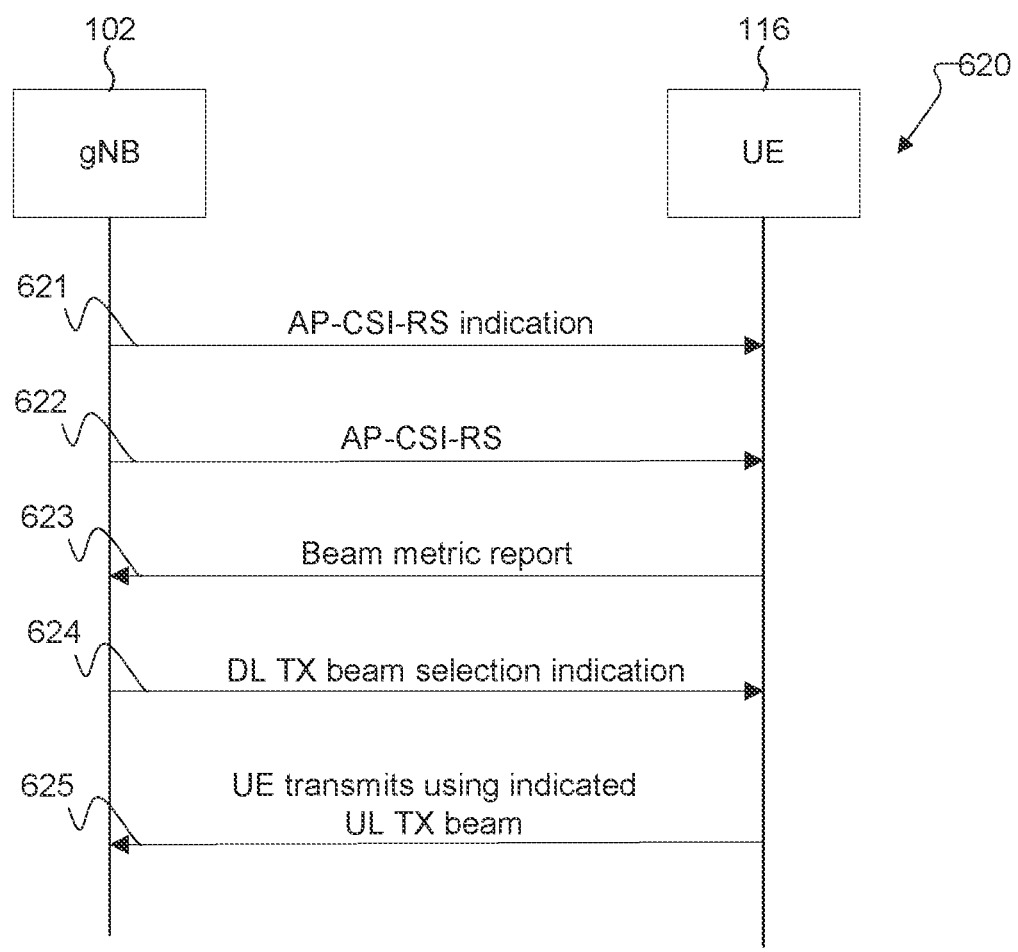
FIGS. 6C and 6D illustrate examples of UL multi-beam operations according to embodiments of the present disclosure.
Figure 6D:
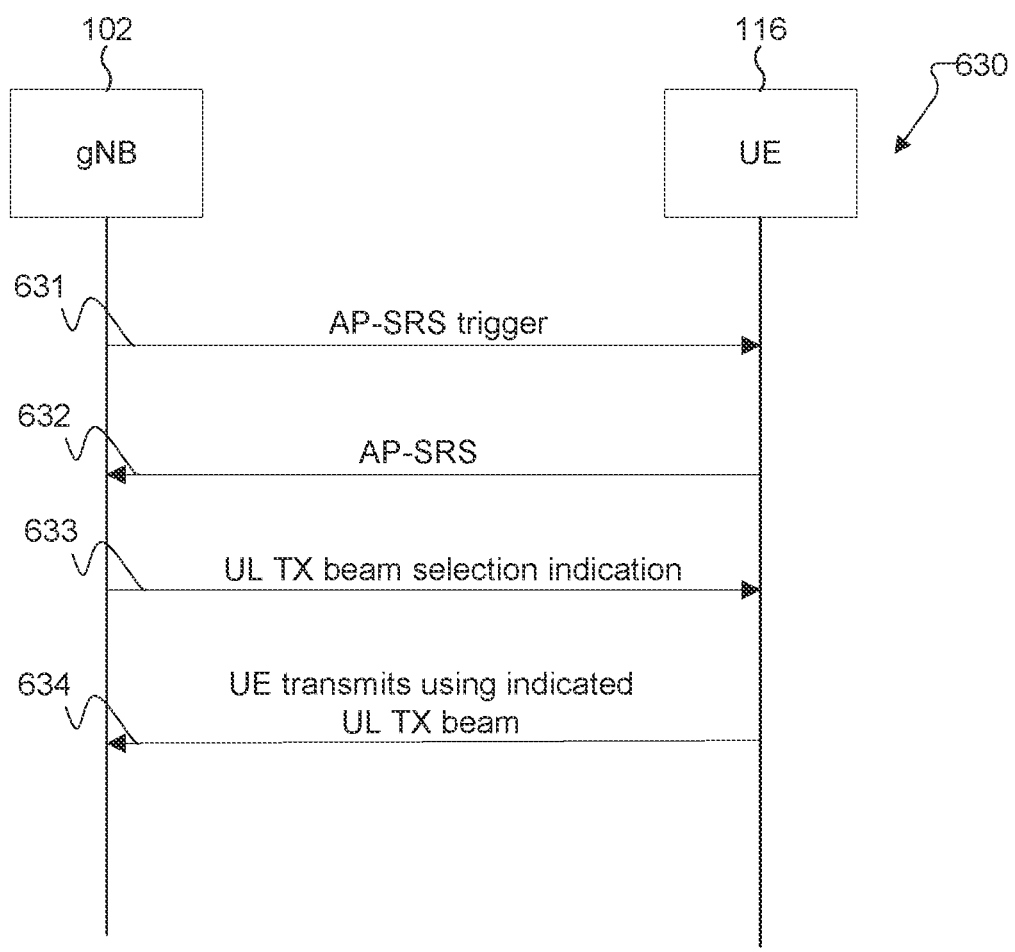

Turning to the examples of FIGS. 6C and 6D, for UL multi-beam operation, the gNB selects a UL RX beam for every UL TX beam (which corresponds to a reference RS) that the gNB expects to receive from the UE. When a UL RS (such as an SRS or DMRS) is used as the reference RS, the gNB triggers or configures the UE to transmit the UL RS (which is associated with a selection of UL TX beam). The gNB, upon receiving and measuring the UL RS, selects a UL RX beam. As a result, a TX-RX beam pair is derived. The gNB can perform this operation for all the configured reference RSs (either per reference RS or by "beam sweeping") and determine all the TX-RX beam pairs associated with all the reference RSs configured to the UE.

When a DL RS (such as a CSI-RS or SSB) is used as the reference RS (pertinent when DL-UL beam correspondence or reciprocity holds), the gNB transmits the RS to the UE (for UL, and by reciprocity this corresponds to a UL RX beam). In response, the UE measures the reference RS (and in the process selects a UL TX beam) and reports the beam metric associated with the quality of the reference RS. In this case, the UE determines the TX-RX beam pair for every configured (DL) reference RS. Therefore, although this knowledge is unavailable to the gNB, the UE—upon receiving a reference RS (hence a UL RX beam) indication from the gNB—can select the UL TX beam from the knowledge of all the TX-RX beam pairs.

FIGS. 6C and 6D illustrate examples of UL multi-beam operations according to embodiments of the present disclosure. The examples of FIGS. 6C and 6D utilize UL-TCI-based UL beam indication after the gNB receives some transmission from the UE. In the embodiment of FIG. 6C, aperiodic CSI-RS is transmitted by the gNB and measured by the UE. This embodiment can be used, for instance, when UL-DL beam correspondence holds. In the embodiment of FIG. 6D, aperiodic SRS is triggered by the gNB and transmitted by the UE so that the gNB can measure the UL channel quality for the purpose of assigning a UL TX beam. This embodiment can be used whether UL-DL beam correspondence holds or not. Although aperiodic RS is used in these two examples, periodic or semi-persistent RS can also be used.

With respect to FIG. 6C, a UL multi-beam operation 620 starts with the gNB signaling to a UE an aperiodic CSI-RS (AP-CSI-RS) trigger or indication (step 621). This trigger or indication can be included in a DCI (either UL-related or DL-related, either separately or jointly signaled with an aperiodic CSI request/trigger) and indicate transmission of an AP-CSI-RS in a same (zero time offset) or later (>0 time offset) slot or sub-frame. Upon receiving the AP-CSI-RS transmitted by the gNB (step 622), the UE measures the AP-CSI-RS and, in turn, calculates and reports a "beam metric" (indicating quality of a particular TX beam hypothesis) (step 623). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB can use the beam report to select a UL TX beam for the UE and indicate the UL TX beam selection (step 624) using the UL-TCI field in the UL-related DCI (that carries the UL grant, such as DCI format 0_1 in NR). In this case, the UL-TCI indicates a reference RS (in this case, an AP-CSI-RS) representing the UL RX beam selected by the gNB. In addition, the UL-TCI can also indicate a "target" RS (e.g. SRS) that is linked to the reference RS (in this case, an AP-CSI-RS). Upon successfully decoding the UL-related DCI with the UL-TCI, the UE selects a UL TX beam and performs UL transmission (such as data transmission on PUSCH) with the UL TX beam associated with the reference CSI-RS (step 625).

In alternative embodiments, the gNB can use the beam report to select a UL TX beam for the UE and indicate the UL TX beam selection (step 624) using a UL-TCI field for the UE in a purpose-designed DL channel for beam indication. A purpose-designed DL channel for beam indication can be UE-specific or for a group of UEs. In this case, the UL-TCI indicates a reference RS (in this case, an AP-CSI-RS) representing the UL RX beam selected by the gNB. In addition, the UL-TCI can also indicate a "target" RS (e.g. SRS) that is linked to the reference RS (in this case, an AP-CSI-RS). Upon successfully decoding a purpose-designed DL channel for beam indication with the UL-TCI, the UE selects a UL TX beam and performs UL transmission (such as data transmission on PUSCH) with the UL TX beam associated with the reference CSI-RS (step 625).

For the embodiments of FIG. 6C, as described above, the UE selects the UL TX beam based on the derived DL RX beam associated with the reference RS index signaled via the UL-TCI field. In this case, the CSI-RS resources (or, in general, the DL RS resources including CSI-RS, SSB, or a combination of the two) configured for the UE as the reference RS resources can be linked to (or associated with) "beam metric" reporting such as CRI/L1-RSRP or L1-SINR.

With respect to FIG. 6D, a UL multi-beam operation 630 starts with the gNB signaling to a UE an aperiodic SRS (AP-SRS) trigger or request (step 631). This trigger can be included in a DCI (either UL-related or DL-related). Upon receiving and decoding the AP-SRS trigger, the UE transmits an AP-SRS to the gNB (step 632) so that the gNB can measure the UL propagation channel and select a UL TX beam for the UE.

The gNB can then indicate the UL TX beam selection (step 633) using the UL-TCI field in the UL-related DCI (that carries the UL grant, such as DCI format 0_1 in NR). In this case, the UL-TCI indicates a reference RS (in this case, an AP-SRS) representing the selected UL TX beam. In addition, the UL-TCI can also indicate a "target" RS (e.g., an SRS) that is linked to the reference RS (in this case, an AP-SRS). Upon successfully decoding the UL-related DCI with the UL-TCI, the UE performs UL transmission (such as data transmission on PUSCH) with the UL TX beam indicated by the UL-TCI (step 634).

In alternative embodiments, a gNB can indicate the UL TX beam selection (step 633) using a UL-TCI field for the UE in a purpose-designed DL channel for beam indication. A purpose-designed DL channel for beam indication can be UE-specific or for a group of UEs. In this case, the UL-TCI indicates a reference RS (in this case, an AP-SRS) representing the selected UL TX beam. In addition, the UL-TCI can also indicate a "target" RS (e.g., an SRS) that is linked to the reference RS (in this case, an AP-SRS). Upon successfully decoding a purpose-designed DL channel for beam indication with the UL-TCI, the UE performs UL transmission (such as data transmission on PUSCH) with the UL TX beam indicated by the UL-TCI (step 634).

For the embodiments of FIG. 6D, as described above, the UE selects the UL TX beam from the reference RS (in this case SRS) index signaled via the UL-TCI field.

In the above example embodiments of FIGS. 6A-6D, the DL and UL beam indication are separate (decoupled). That is to say, the DL beam indication is based on DL-TCI indication and the UL beam indication is based on UL-TCI. In some embodiments, a joint-TCI that couples DL and UL beam indications (either partially or fully) can be used in place of a DL-TCI or UL-TCI above. An example use case of the joint-TCI indication is in a reciprocal system in which UL-DL beam correspondence holds.

Figure 7:
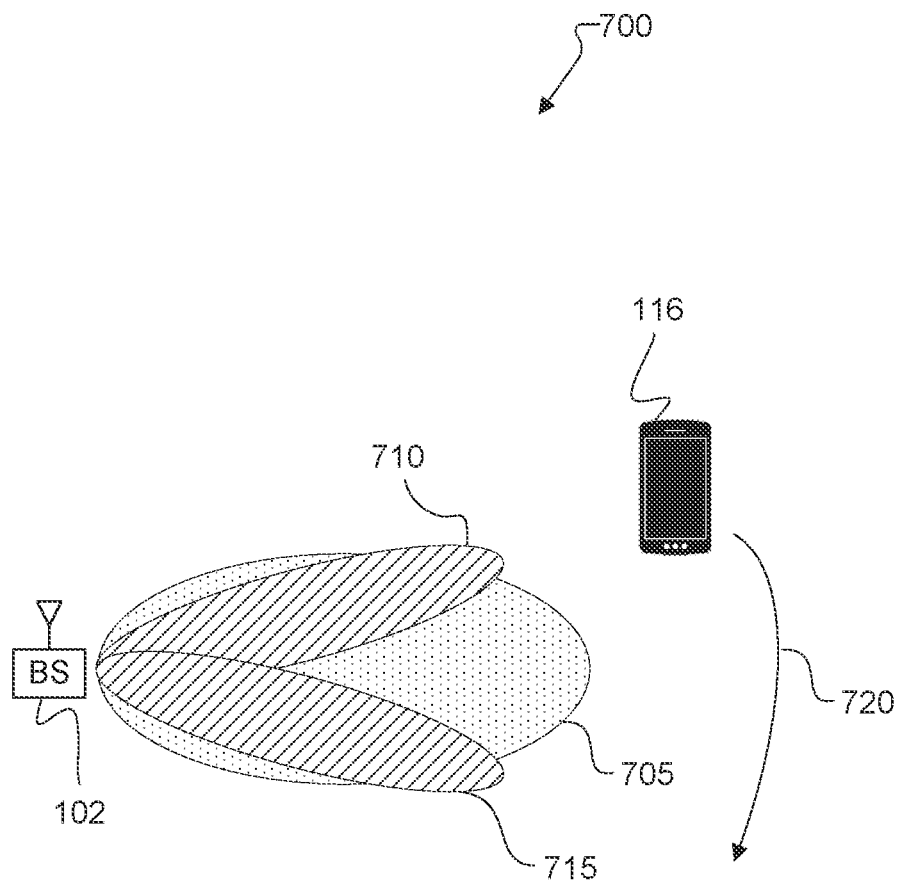
FIG. 7 illustrates an example beam configuration according to embodiments of the present disclosure.
Figure 8:
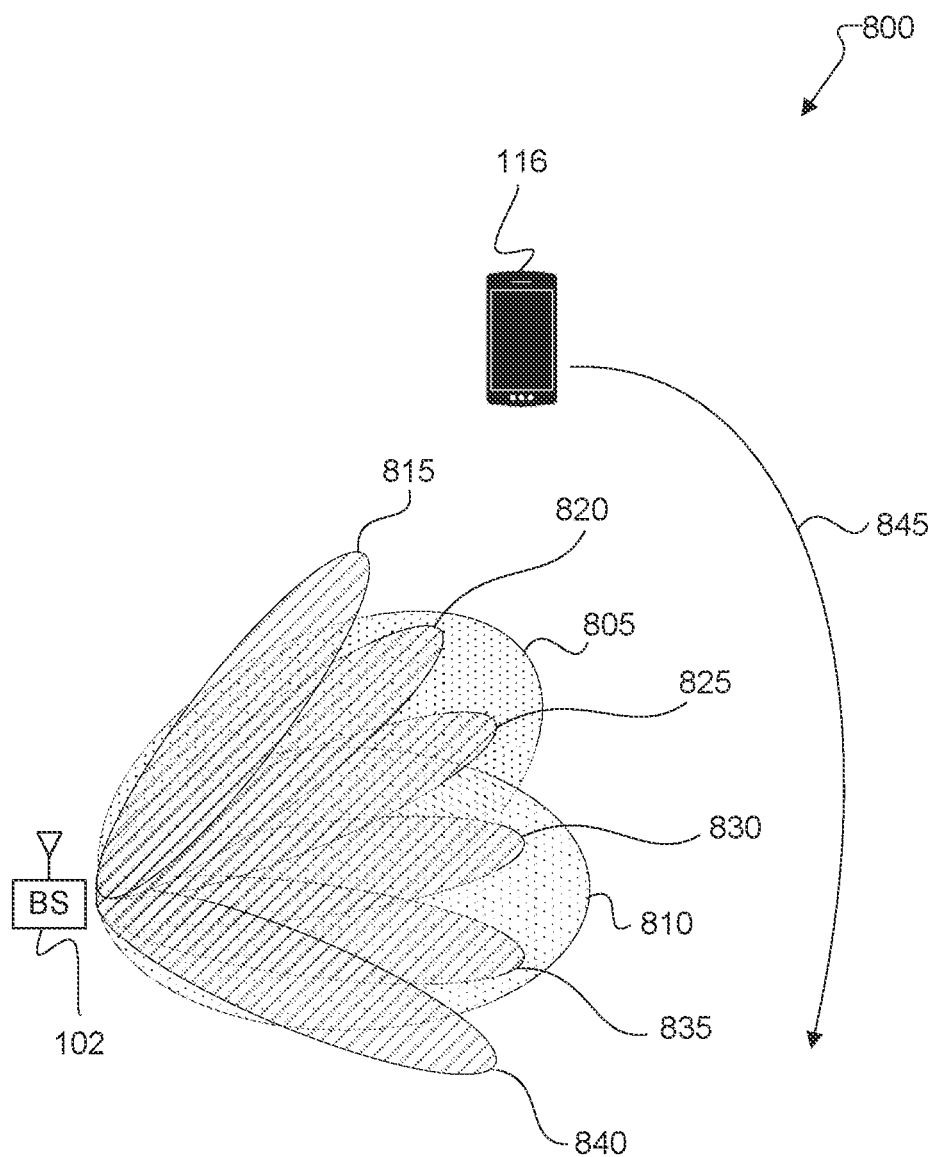
FIG. 8 illustrates an example beam configuration according to embodiments of the present disclosure.

FIGS. 7 and 8 discussed below relate to design aspects of TCI channel beams—that is, beams that convey a TCI, SRI, or any other suitable beam indication parameter or field. As discussed above, any given beam in a system has a corresponding TCI state that characterizes the beam, and accordingly the TCI channel beams convey, e.g., a TCI that indicates a TCI state. Additionally, a beam used for a channel may be referred to as the TCI state of the channel, e.g., the TCI state of the TCI channel can refer to the TCI channel beam, or the TCI state of the DL channel (DL-TCI) or the TCI state of the UL channel (UL-TCI) can refer to the DL channel beam or UL channel beam, respectively.

FIG. 7 illustrates an example beam configuration 700 according to embodiments of the present disclosure. The example of FIG. 7 illustrates communications between a gNB 102 and a UE 116, however it is understood that the example of FIG. 7 could apply to any suitable beamforming-capable wireless communication devices.

The beam configuration 700 includes a wide TCI channel beam 705 and narrow UE-specific channel beams 710 and 715. Wide and narrow are relative terms—a wide beam can encompass more than one narrow beam. In this example, the wide TCI channel beam 705 encompasses several narrow UE-specific channel beams 710 and 715 and transmits the TCI channel from the gNB 102 to the UE 116. The narrow UE-specific channel beams 710 and 715 are used for transmission or reception of UE-specific DL or UL channels that are not for beam indication (e.g., data channels such as PDSCH or PUSCH, or control channels such as PDCCH or PUCCH, for the specific UE 116). In some embodiments, the narrow beams can be used for transmission or reception of UE group channels or UE common channels (e.g., data or control channels for multiple UEs). In some embodiments, the wide beams can be used for transmission or reception of UE group channels or UE common channels (e.g., data or control channels for multiple UEs). In some embodiments, a UE-specific channel beam can only be used for transmission of either data or control channels, while in other embodiments, a UE-specific channel beam can be used for transmission of both data or control channels. In the latter case, the data channels and control channels for the specific UE can be said to share a common TCI state. This can also correspond to the UL channels and DL channels for the specific UE sharing a common TCI state.

As illustrated in FIG. 7, the UE 116 begins in the coverage area of the narrow beam 710 and moves along path 720, which takes it out of the coverage area of narrow beam 710 and into the coverage area of narrow beam 715. This represents a change in channel conditions that causes the narrow beam suitable for transmission or reception of UE-specific DL or UL channels to change from narrow UE-specific channel beam 710 (the old beam or current beam) to narrow UE-specific channel beam 715 (the new beam). Because both narrow beams are within the coverage area of the wide TCI channel beam 705, a TCI channel transmitted on the wide TCI channel beam 705 can be used to indicate the narrow UE-specific channel beam 715 as the new beam for transmission or reception of UE-specific DL or UL channels (e.g., by conveying a TCI indicating the TCI state of the narrow UE-specific channel beam 715).

In embodiments where the narrow UE-specific channel beams 710 and 715 are for UE-specific DL channels (e.g., PDSCH or PDCCH), the TCI channel can be: a PDCCH channel with DL-related DCI that includes at least DL-TCI or joint-TCI, a PDCCH channel with UL-related DCI that includes DL-TCI, UL-TCI, or joint-TCI, a purpose-designed DL channel for beam indication that includes at least DL-TCI or joint-TCI, or a MAC CE that conveys TCI. In such embodiments, from the perspective of the gNB 102 the TCI channel beams and the UE-specific channel beams are TX beams, while from the perspective of the UE 116 they are RX beams.

In embodiments where the narrow UE-specific channel beams 710 and 715 are for UE-specific UL channels (e.g., PUSCH, PUCCH, or PRACH), the TCI channel can be: a PDCCH channel with UL-related DCI that includes at least UL-TCI or joint-TCI, a PDCCH channel with DL-related DCI that includes UL-TCI, DL-TCI, or joint-TCI, a purpose-designed DL channel for beam indication that includes least UL-TCI or joint-TCI, or a MAC CE that conveys TCI. In such embodiments, from the perspective of the gNB 102 the TCI channel beam is a TX beam and the UE-specific channel beams are RX beams, while from the perspective of the UE 116 the TCI channel beam is an RX beam and the UE-specific channel beams are TX beams.

Although FIG. 7 illustrates one example of a beam configuration 700, various changes may be made to FIG. 7. For example, any number of narrow UE-specific channel beams and wide TCI channel beams could be present to provide coverage of additional spatial resources. Additionally, any number of UEs or other beamforming-capable wireless communication devices could be in communication with the gNB 102.

FIG. 8 illustrates an example beam configuration 800 according to embodiments of the present disclosure. The example of FIG. 8 illustrates communications between a gNB 102 and a UE 116, however it is understood that the example of FIG. 8 could apply to any suitable beamforming-capable wireless communication devices.

The beam configuration 800 includes wide TCI channel beams 805 and 810, and narrow UE-specific channel beams 815, 820, 825, 830, 835, and 840. As noted above, wide and narrow are relative terms—a wide beam can encompass more than one narrow beam. In this example, the wide TCI channel beam 805 encompasses narrow UE-specific channel beams 815, 820, 825, and 830. The wide TCI channel beam 810 encompasses narrow UE-specific channel beams 825, 830, 835, and 840. Wide TCI channel beams 805 and 810 have partially overlapping coverage areas, and as a result the narrow UE-specific channel beams 825 and 830 are encompassed by both of the wide TCI channel beams 805 and 810.

As illustrated in FIG. 8, the UE 116 begins in the coverage area of the narrow beam 815 and moves along path 845, which takes it sequentially through the coverage areas of narrow beams 820, 825, 830, and finally 835. This represents a change in channel conditions that causes the narrow beam suitable for transmission or reception of UE-specific DL or UL channels to change from narrow UE-specific channel beam 815 (the old beam or current beam) sequentially to narrow UE-specific channel beams 820, 825, 830, and 835 (sequential new beams). Additionally, the UE 116 begins in the coverage area of wide TCI channel beam 805 and moves into the coverage area of wide TCI channel beam 810. This represents a change in channel conditions that causes the wide beam suitable for transmission of TCI channels to change from wide TCI channel beam 805 to wide TCI channel beam 810.

In this embodiment, a TCI channel can indicate both a TCI state of a new beam to be used for the next transmission of narrow UE-specific channels and a TCI state of a new beam to be used for the next transmission of the TCI channel. For example, because narrow UE-specific channel beams 825 and 830 are encompassed by both of the wide TCI channel beams 805 and 810, a TCI channel transmitted on the wide TCI channel beam 805 that indicates a change from narrow UE-specific channel beam 820 (the old UE-specific channel beam) to 825 (the new UE-specific channel beam) can also indicate a change from wide TCI channel beam 805 (the old TCI channel beam) to 810 (the new TCI channel beam). The beam indication for the new TCI channel beam can be explicit (e.g., a TCI indicating the TCI state of wide TCI channel beam 810) or implicit (as discussed further below). The beam indication that indicates the wide TCI channel beam 810 as the new TCI channel beam could alternatively be included in the TCI channel that indicates a change from narrow UE-specific channel beam 825 to 830, or from narrow UE-specific channel beam 830 to 835.

Implicit beam indication for the new TCI channel beam can occur in various ways. In some embodiments, the UE 116 is pre-configured (e.g., via higher layer signaling) with information that associates each narrow UE-specific channel beam with the wide TCI channel beam that encompasses it. The UE 116 can then infer, from an indication of a new narrow UE-specific channel beam, an indication of a new wide TCI channel beam. For example, if the UE 116 receives a TCI channel on the wide TCI channel beam 805 that includes a beam indication for narrow UE-specific channel beam 825 as a new UE-specific channel beam, the UE 116 can infer a beam indication for wide TCI channel beam 810 as a new TCI channel beam.

In some embodiments, the UE 116 is additionally pre-configured (e.g., via higher layer signaling) with information that associates each narrow UE-specific channel beam with the adjacent narrow UE-specific channel beams on either side. In such embodiments, the UE 116, when receiving a beam indication for a new UE-specific channel beam, can infer its direction of movement based on comparison of the TCI state of the old UE-specific channel beam and the TCI state of the new UE-specific channel beam. The UE 116 can then use this knowledge in conjunction with the pre-configured association between narrow UE-specific channel beams and wide TCI channel beams to infer a beam indication for a new TCI channel beam. For example, when narrow UE-specific channel beam 820 is the old UE-specific channel beam and the UE 116 receives a beam indication on wide TCI channel beam 805 that indicates narrow UE-specific channel beam 825 as a new UE-specific channel beam, the UE 116 can infer that it is moving towards the coverage area of wide TCI channel beam 810. From this, the UE 116 can infer a beam indication for wide TCI channel beam 810 as a new TCI channel beam. Conversely, when narrow UE-specific channel beam 825 is the old UE-specific channel beam and the UE 116 receives a beam indication on wide TCI channel beam 810 that indicates narrow UE-specific channel beam 830 as a new UE-specific channel beam, the UE infers that it is moving away from the coverage area of wide TCI channel beam 805 (and is remaining within the coverage area of wide TCI channel beam 810), so the UE does not infer a beam indication for wide TCI channel beam 805, in spite of the fact that narrow UE-specific channel beam 830 is associated with wide TCI channel beam 805.

After the UE 116 has received, on the wide TCI channel beam 805, the TCI channel that indicates the wide TCI channel beam 810 as the new TCI channel beam (either explicitly or implicitly), the subsequent TCI channel will be transmitted on the wide TCI channel beam 810, indicating the next new beam to be used for the narrow UE-specific channels. In this way, as the UE travels along path 845 it is able to receive TCIs indicating, sequentially, new narrow UE-specific channel beams 820, 825, 830, and 835 as new beams for transmission or reception of UE-specific DL or UL channels, and TCIs indicating new wide TCI channel beam 810 as a new beam for reception of TCI channels.

Similar to FIG. 7, in embodiments where the narrow UE-specific channel beams 815, 820, 825, 830, 835, and 840 are for UE-specific DL channels (e.g., PDSCH or PDCCH), the TCI channel can be: a PDCCH channel with DL-related DCI that includes at least DL-TCI or joint-TCI, a PDCCH channel with UL-related DCI that includes DL-TCI, UL-TCI, or joint-TCI, a purpose-designed DL channel for beam indication that includes at least DL-TCI or joint-TCI, or a MAC CE that conveys TCI. In such embodiments, from the perspective of the gNB 102 the TCI channel beams and the UE-specific channel beams are TX beams, while from the perspective of the UE 116 they are RX beams.

Also similar to FIG. 7, in embodiments where the narrow UE-specific channel beams 815, 820, 825, 830, 835, and 840 are for UE-specific UL channels (e.g., PUSCH, PUCCH, or PRACH), the TCI channel can be: a PDCCH channel with UL-related DCI that includes at least UL-TCI or joint-TCI, a PDCCH channel with DL-related DCI that includes UL-TCI, DL-TCI, or joint-TCI, a purpose-designed DL channel for beam indication that includes least UL-TCI or joint-TCI, or a MAC CE that conveys TCI. In such embodiments, from the perspective of the gNB 102 the TCI channel beam is a TX beam and the UE-specific channel beams are RX beams, while from the perspective of the UE 116 the TCI channel beam is an RX beam and the UE-specific channel beams are TX beams.

Although FIG. 8 illustrates one example of a beam configuration 800, various changes may be made to FIG. 8. For example, any number of narrow UE-specific channel beams and wide TCI channel beams could be present to provide coverage of additional spatial resources. Additionally, any number of UEs or other beamforming-capable wireless communication devices could be in communication with the gNB 102.

In the examples of FIGS. 7 and 8 above, the TCI channel beam is a separate beam from the UE-specific channel beams, and only the TCI channel is transmitted on the TCI channel beam. In other embodiments, the TCI channel beam and the UE-specific channel beam can be the same beam (i.e., share the same TCI state). That is, both the TCI channel and at least one of the UE-specific data or control DL or UL channels can be transmitted using one beam.

Furthermore, in the example of FIG. 8 above, embodiments are disclosed in which a TCI channel can indicate both a TCI state of a new UE-specific channel beam and a TCI state of a new TCI channel beam. In some embodiments, both TCI states (i.e., of the UE-specific channel beam and of the TCI channel beam) can be indicated in a single TCI channel transmission. That is, both TCI states can be explicitly signaled in one TCI channel transmission, or the TCI state of the TCI channel beam can be derived from a TCI channel transmission that explicitly signals only the TCI state of the UE-specific channel beam (as discussed above).

In other embodiments, the TCI state for the new TCI channel beam and the TCI state for the new UE-specific channel beam can be explicitly signaled in different transmissions. In some embodiments, the same TCI channel can be used, in different transmissions, to indicate TCI states for both the TCI channel beam and the UE-specific channel beam. In other embodiments, two different TCI channels can be used.

For example, a first TCI channel can be used to indicate new TCI states for the UE-specific channel beam, and a second TCI channel can be used to indicate a new TCI state for the TCI channel beam. In some such embodiments, both TCI channels are transmitted on the TCI channel beam. In other such embodiments, the first TCI channel is transmitted on the TCI channel beam, and the second TCI channel is transmitted on a UE-specific beam.

In embodiments using first and second TCI channels, the first and second TCI channels can each be transmitted using different signaling. For example, the first TCI channel can be an L1 control channel (e.g., DCI) and the second TCI channel can be a MAC CE (or vice versa). Alternatively, the first TCI channel can be a first L1 control channel (e.g., DCI) and the second TCI channel can be a second L1 control channel (e.g., DCI). Furthermore, the first TCI channel can be a first MAC CE and the second TCI channel can be a second MAC CE.

A further consideration in the embodiments above is the timing of applying a new beam for transmitting or receiving a channel after receiving a beam indication for that channel (whether implicit or explicit)—in other words, the timing of updating the TCI state for a channel after receiving a TCI indicating the new TCI state for the channel. It is important that both the transmitter and the receiver align the timing of their respective updates to the TCI state, or transmission of the channel may fail because the receiver may not be monitoring the correct beam. Two considerations for use in aligning TCI state updates at the gNB and the UE are feedback acknowledgement (e.g., a HACK ARQ in response to a DL channel beam indication or a PUSCH in response to a UL channel beam indication) transmitted from the UE to the gNB after successful receipt of a TCI channel, and the use of a pre-configured time delay beginning from a pre-configured point in time (e.g., beginning from reception of the beam indication at the UE or transmission of the feedback acknowledgement from the UE).

Various examples of timing for applying new TCI states are disclosed below. In these examples, a gNB (such as gNB 102) transmits a TCI channel to a UE (such as UE 116) according to the embodiments discussed in this disclosure. The TCI channel conveys one or more TCIs to the UE, which indicate one or more TCI states (e.g., for one or both of a UE-specific channel or a TCI channel) to be applied to future transmissions or receptions of the corresponding channel. Additionally, all DL channels are transmitted from the gNB to the UE, and all UL channels are transmitted from the UE to the gNB. It is understood that any suitable beamforming-capable wireless communication devices could be substituted for the gNB and UE.

In some examples of timing for applying new TCI states, the TCI channel is a PDCCH with a DL-related DCI including at least: a DL-TCI or a UL-TCI, and DL assignment information. The PDCCH with DL-related DCI can be followed by a PDSCH transmission from the gNB. In response to receiving the PDSCH, a UE can transmit a HARQ ACK to the gNB, which can be recognized by the gNB as feedback acknowledgement for reception of the TCI channel. The gNB can recognize the HARQ ACK as an indication of reception of the TCI channel.

In some embodiments of such examples, the UE applies new TCI states indicated by the DL-TCI or UL-TCI to the corresponding channels immediately after transmitting the HARQ ACK, and the gNB likewise applies the new TCI states immediately after receiving the HARQ ACK. In other embodiments, if the TCI channel includes an indication of a new TCI state for a UE-specific channel (e.g., in the case of DL-TCI, a PDSCH or a PDCCH not for beam indication, or in the case of UL-TCI, a PUSCH, a PRACH, or a PUCCH, which can include a PUCCH carrying the HARQ ACK), the new TCI state is applied for the UE-specific channel after a time period $T_1$ (which may be referred to as "timeDurationForQCL"), the period $T_1$ beginning either after transmitting the HARQ ACK or after reception of the TCI channel. If the TCI channel includes an indication of a new TCI state for the TCI channel, the new TCI state is applied for the TCI channel after a time period $T_2$ (which may be referred to as "timeDurationForQCLForBeamIndication"), the period $T_2$ beginning either after transmitting the HARQ ACK or after reception of the TCI channel. In some cases $T_2$ and $T_1$ are the same time period (i.e., $T_2=T_1$).

In other examples of timing for applying new TCI states, the TCI channel is a PDCCH channel with a UL-related DCI including at least: a UL-TCI or a DL-TCI, and a UL grant. The PDCCH with UL-related DCI can be followed by a PUSCH transmission from the UE. The PUSCH transmission can be recognized by the gNB as feedback acknowledgement for reception of the TCI channel.

In some embodiments of such examples, the UE applies new TCI states indicated by the UL-TCI or DL-TCI to the corresponding channels immediately after transmitting the PUSCH, and the gNB likewise applies the new TCI states immediately after receiving the PUSCH. In other embodiments, if the TCI channel includes an indication of a new TCI state for a UE-specific channel (e.g., in the case of DL-TCI, a PDSCH or a PDCCH not for beam indication, or in the case of UL-TCI, a future PUSCH, a PUCCH, or a PRACH), the new TCI state is applied for the UE-specific channel after a time period $T_1$, the period $T_1$ beginning either after transmitting the PUSCH or after reception of the TCI channel. If the TCI channel includes an indication of a new TCI state for the TCI channel, the new TCI state is applied for the TCI channel after a time period $T_2$, the period $T_2$ beginning either after transmitting the PUSCH or after reception of the TCI channel. In some cases $T_2$ and $T_1$ are the same time period (i.e., $T_2=T_1$).

In other examples of timing for applying new TCI states, the TCI channel is either a purpose-designed DL channel for beam indication or a MAC CE, and is either UE-specific or to a UE-group. The purpose-designed DL channel or the MAC CE in these examples includes at least DL-TCI, UL-TCI, or Joint-TCI.

In some embodiments of such examples, the UE transmits a HARQ ACK to the gNB in response to reception of the TCI channel, and the HARQ ACK can be recognized by the gNB as feedback acknowledgement for reception of the TCI channel. In other embodiments, the UE does not transmit a HARQ ACK, and the gNB infers the successful reception of the TCI channel based on transmission or reception beams used by the UE for following transmissions or receptions, or based on the decoding status of such transmissions or receptions.

In yet other embodiments of such examples, the gNB blindly repeats the transmission of the TCI channel over multiple time instances, stopping when the gNB receives a HARQ ACK from the UE (or from all UEs in a UE-group) or when a maximum number of repetitions have been reached. The maximum number of repetitions can be fixed by specifications, configured by higher layer signaling (e.g. RRC signaling), configured by a MAC CE, or indicated by L1 control information. Alternatively, the gNB transmits the TCI channel periodically. A transmission period and offset for the periodic TCI channel transmissions can be fixed by specifications, configured by higher layer signaling (e.g., RRC signaling), configured by a MAC CE, or indicated by L1 control information.

After receiving the TCI channel according to one of the above embodiments of examples wherein the TCI channel is a purpose-designed DL channel for beam indication or a MAC CE, the UE and gNB may apply new TCI states conveyed by the TCI channel using the following timings. In some embodiments, the UE applies new TCI states indicated by the UL-TCI, DL-TCI, or Joint-TCI to the corresponding channels immediately after receiving the TCI channel, and the gNB likewise applies the new TCI states immediately after transmitting the TCI channel. In other embodiments, if the TCI channel includes an indication of a new TCI state for a UE-specific channel (e.g., DL data or control channels not for beam indication, or UL data or control channels), the new TCI state is applied for the UE-specific channel after a time period $T_1$, the period $T_1$ beginning either after transmitting the HARQ ACK or after reception of the TCI channel. If the TCI channel includes an indication of a new TCI state for the TCI channel, the new TCI state is applied for the TCI channel after a time period $T_2$, the period $T_2$ beginning either after transmitting the HARQ ACK or after reception of the TCI channel. In some cases $T_2$ and $T_1$ are the same time period (i.e., $T_2=T_1$).

In other examples of timing for applying new TCI states, the TCI channel is a PDCCH channel with a DL-related DCI including at least a DL-TCI, UL-TCI, or Joint-TCI, but including no DL assignment information. The UE transmits HARQ ACK feedback to the gNB in response to reception of the TCI channel, and the HARQ ACK can be recognized by the gNB as feedback acknowledgement for reception of the TCI channel.

In these examples, a first TCI channel includes an indication of a new TCI state for a UE-specific channel (e.g., DL data or control channels not for beam indication, or UL data or control channels), and the new TCI state is applied for the UE-specific channel after a time period $T_1$, the period $T_1$ beginning either after transmitting the HARQ ACK or after reception of the first TCI channel. In some embodiments of such examples, the first TCI channel also includes an indication of a new TCI state for the first TCI channel, and the new TCI state is applied for the first TCI channel after a time period $T_2$, the period $T_2$ beginning either after transmitting the HARQ ACK or after reception of the first TCI channel. In other embodiments of such examples, a second TCI channel includes the indication of the new TCI state for the first TCI channel, and the new TCI state is applied for the first TCI channel after a time period $T_2$, the period $T_2$ beginning either after transmitting a HARQ ACK (e.g., a second HARQ ACK indicating reception of the second TCI channel) or after reception of the second TCI channel. In some cases for the above, $T_2$ and $T_1$ are the same time period (i.e., $T_2=T_1$).

In other examples of timing for applying new TCI states, the TCI channel is a PDCCH channel with a UL-related DCI including at least a DL-TCI, UL-TCI, or Joint-TCI, but including no UL grant (i.e., having a "UL-SCH indicator" set to "0") and including a UL CSI request (i.e., having a non-zero "CSI request", where the associated "reportQuantity" in CSI-ReportConfig is set to "none" for all CSI report(s) triggered by "CSI request" in this DCI). The UE can ignore all fields of the DCI except for the "CSI request" field and the TCI. Alternatively, the TCI channel also has no UL CSI request (i.e., "CSI request" is set to "0"). The UE transmits HARQ ACK feedback to the gNB in response to reception of the TCI channel, and the HARQ ACK can be recognized by the gNB as feedback acknowledgement for reception of the TCI channel.

In these examples, a first TCI channel includes an indication of a new TCI state for a UE-specific channel (e.g., DL data or control channels not for beam indication, or UL data or control channels), and the new TCI state is applied for the UE-specific channel after a time period $T_1$, the period $T_1$ beginning either after transmitting the HARQ ACK or after reception of the first TCI channel. In some embodiments of such examples, the first TCI channel also includes an indication of a new TCI state for the first TCI channel, and the new TCI state is applied for the first TCI channel after a time period $T_2$, the period $T_2$ beginning either after transmitting the HARQ ACK or after reception of the first TCI channel. In other embodiments of such examples, a second TCI channel includes the indication of the new TCI state for the first TCI channel, and the new TCI state is applied for the first TCI channel after a time period $T_2$, the period $T_2$ beginning either after transmitting a HARQ ACK (e.g., a second HARQ ACK indicating reception of the second TCI channel) or after reception of the second TCI channel. In some cases for the above, $T_2$ and $T_1$ are the same time period (i.e., $T_2=T_1$).

In each of the above examples of timing for applying new TCI states, $T_1$ (e.g., timeDurationForQCL) and $T_2$ (e.g., timeDurationForQCLForBeamIndication) can depend on a UE capability of the UE. The first and second time periods can be configured to the UE by higher layer signaling (e.g., RRC signaling), a MAC CE, or L1 control signaling. In any of the above examples wherein the UE is configured to use the time period $T_2$ to apply a new beam, but the UE has not received configuration information configuring the time period $T_2$, the UE can set $T_2$ equal to $T_1$.

Figure 9A:
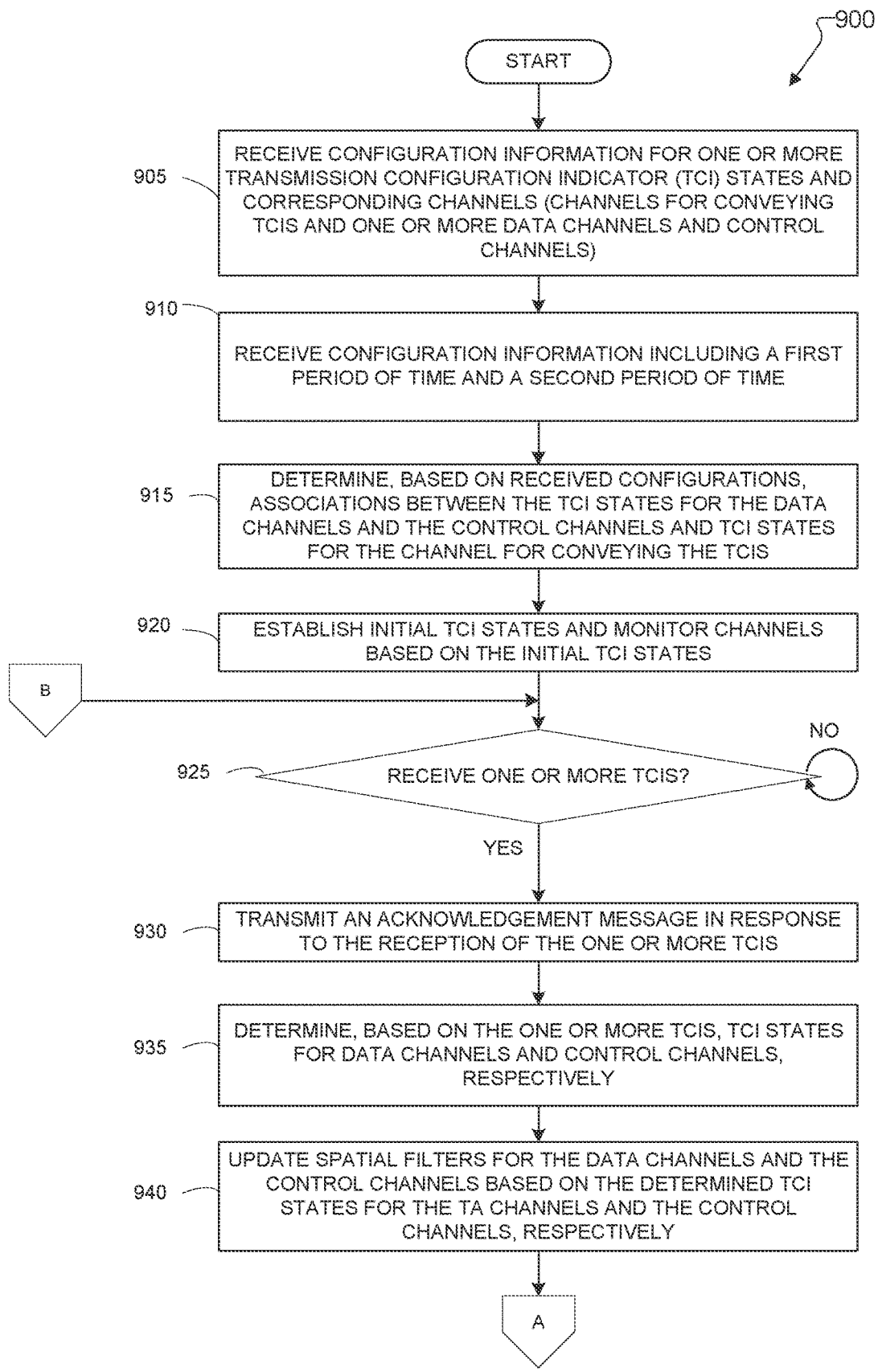
FIGS. 9A-9B illustrate an example process for beam management by a UE in accordance with various embodiments of the present disclosure.
Figure 9B:
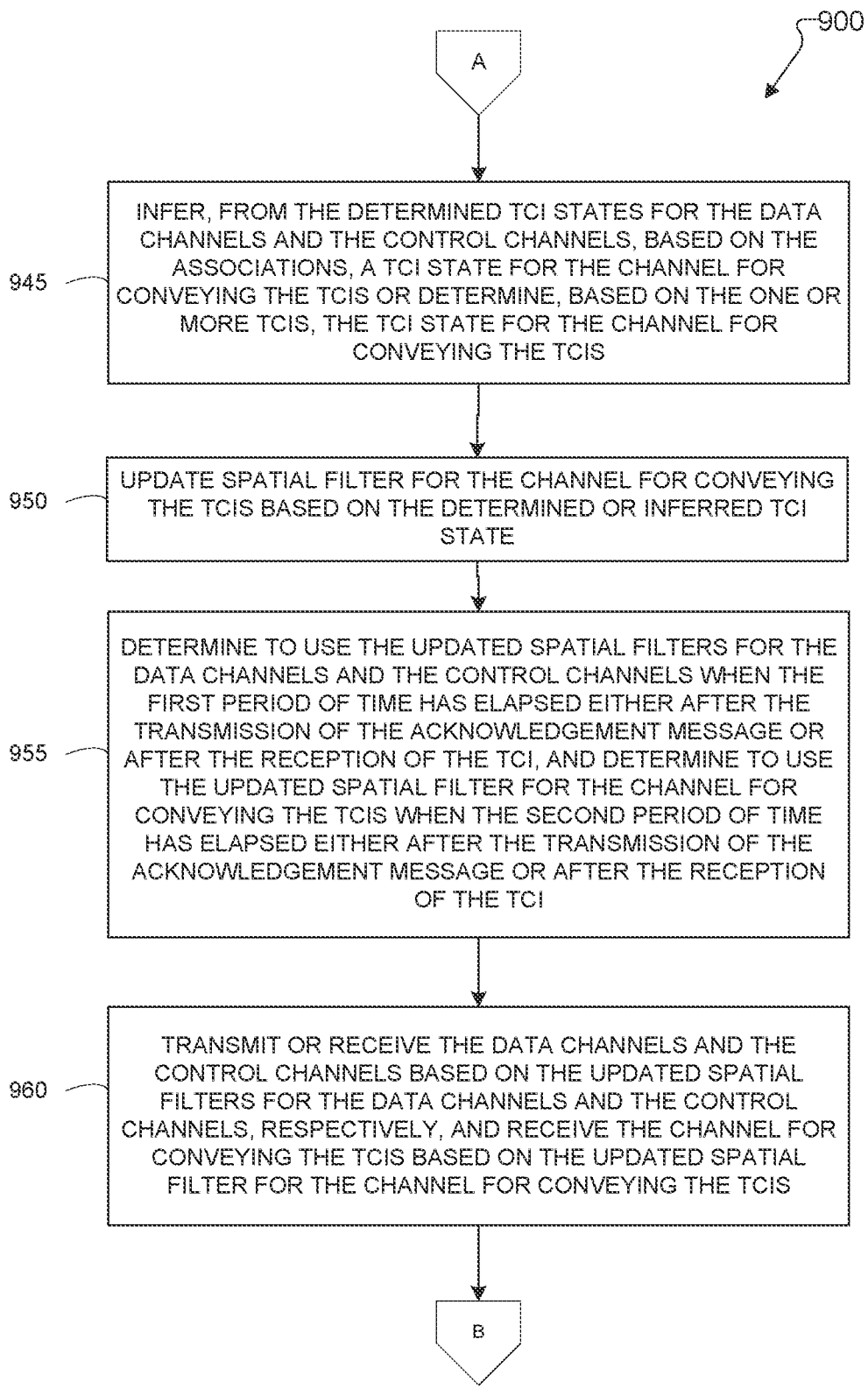
Figure 10A:
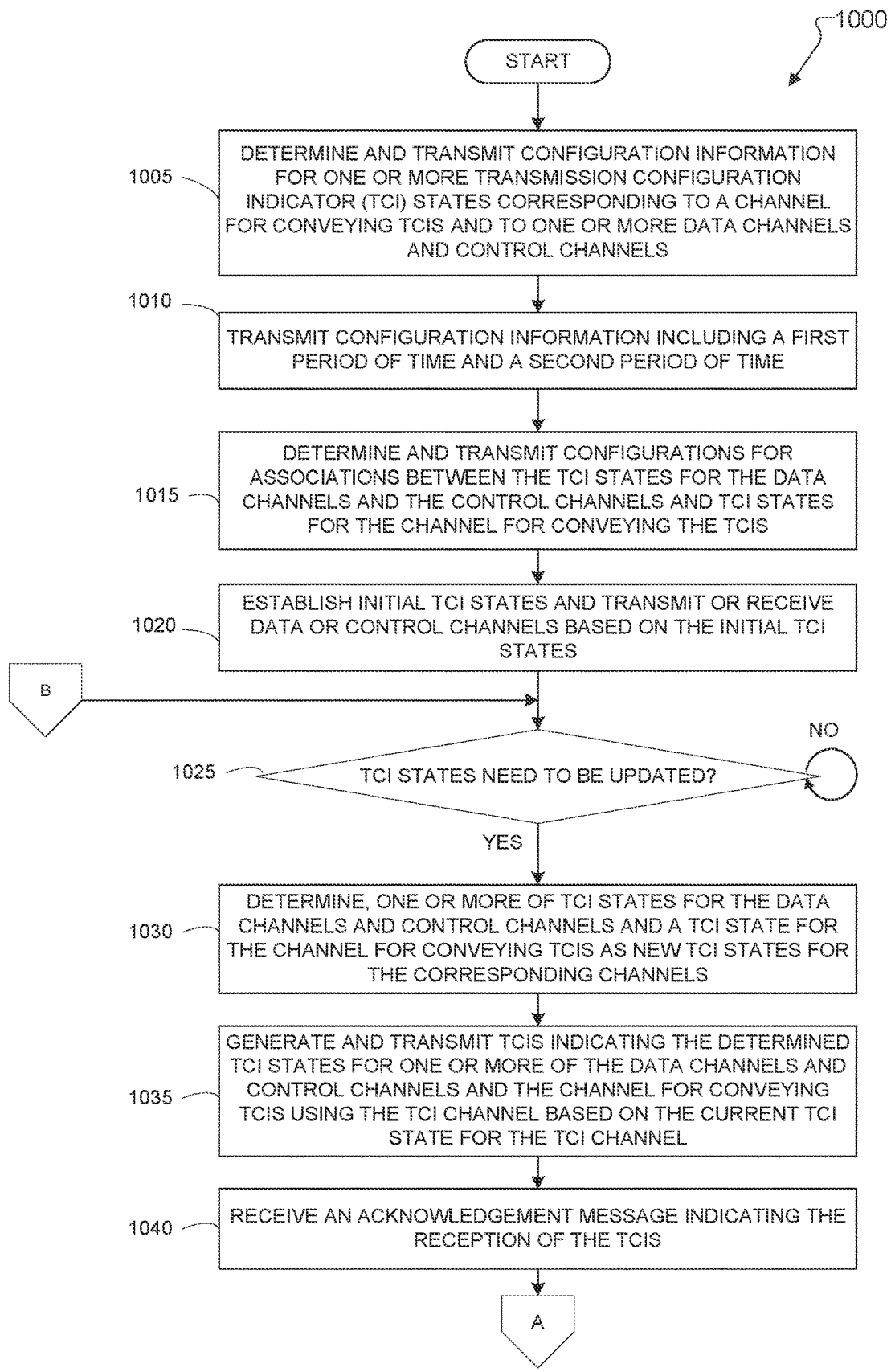
FIGS. 10A-10B illustrate an example process for beam management by a gNB in accordance with various embodiments of the present disclosure.
Figure 10B:
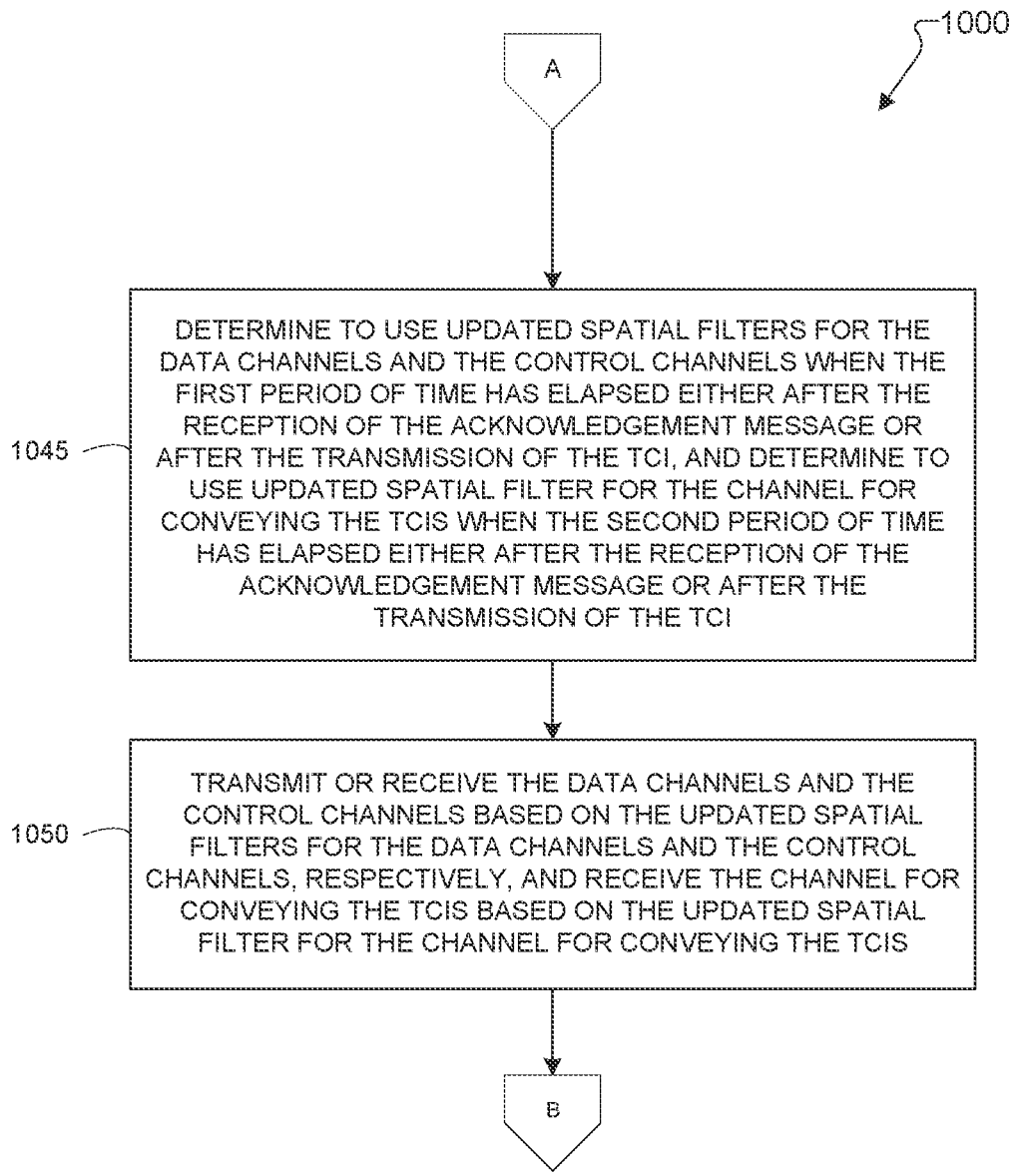

FIGS. 9A-9B and 10A-10B illustrate examples of a process for beam management in accordance with various embodiments of the present disclosure. The process depicted in FIGS. 9A-9B is performed by the UE 116, and the process depicted in FIGS. 10A-10B is performed by the gNB 102, however it is understood that the processes of FIGS. 9A-9B and 10A-10B could be performed by any suitable beam-forming-enabled wireless receiver and transmitter, respectively.

FIGS. 9A-9B illustrate an example process 900 for beam management by a UE in accordance with various embodiments of the present disclosure. The process begins by the UE receiving configuration information for one or more TCI states and corresponding channels, e.g., a channel for conveying TCIs (i.e., TCI channel) and one or more data channels and control channels (i.e., UE-specific channels) (step 905). The UE can receive this configuration information via higher layer signaling (e.g., RRC signaling), a MAC CE, or L1 control signaling. The data channels and the control channels can include one or more UE-specific channels, which can be DL channels and UL channels.

The configuration information can include, for example, a set of TCI states corresponding to $ND_K$ narrow UE-specific DL channel beams (e.g., DL-TCI states), which the UE may assume are used for PDSCH or PDCCH channels (e.g., data or control channels not for beam indication), a set of TCI states corresponding to $NU_M$ narrow UE-specific UL channel beams (e.g., UL-TCI states) which the UE may assume are used for uplink channels (e.g., data or control channels such as PUSCH, or PUCCH, or PRACH), and a set of TCI states corresponding to $W_N$ TCI channel beams which the UE may assume are used for receiving the TCI channel (e.g., the channel for conveying TCIs).

In some cases, narrow DL channel beams and narrow UL channel beams can be from a same set that can be indicated by a joint-TCI. Additionally, the TCI channel beams can be from the same set that is indicated by the joint-TCI. In other embodiments, the narrow DL channel beams and TCI channel beams can be from a same set.

Next, the UE receives configuration information including a first period of time (e.g., $T_1$ or timeDurationForQCL) and a second period of time (e.g., $T_2$ or timeDurationForQCLForBeamIndication) (step 910). In some embodiments, the UE receives this configuration information using one of higher layer signaling (e.g., RRC signaling), a MAC CE, or L1 control signaling. The UE may also receive only the first period of time, in which case the UE can set the second period of time equal to the first period of time (e.g., $T_2=T_1$). The configuration information of step 910 can also be received in step 905.

Next, the UE determines, based on received configurations, associations between the TCI states for the data channels and control channels (i.e., UE-specific channels) and the TCI states for the channels for conveying TCIs (i.e., TCI channels) (step 915). In some embodiments, these associations are determined based on configurations received from the gNB that defines, or generates, the associations.

These associations can include an association between any one or more of the TCI states for the one or more UE-specific channels and one of the TCI states for the channel for conveying the TCIs—that is, a "one-to-one" association wherein one and only one narrow beam is encompassed by one TCI channel beam (e.g., the narrow beam and the TCI channel beam share a same TCI state and are the same beam). The associations can further include an association between multiple of the TCI states for the one or more UE-specific channels and the one of the TCI states for the channel for conveying the TCIs—that is, a "many-to-one" association wherein multiple narrow beams are encompassed by and associated with one and only one TCI channel beam (as shown in the example of FIG. 7). The associations can also include an association between at least one of the TCI states for the one or more UE-specific channels and multiple of the TCI states for the channel for conveying the TCIs—that is, a "many-to-many" association wherein a TCI channel beam encompasses multiple narrow beams, and a narrow beam is encompassed by more than one TCI channel beam (e.g., the TCI channel beams overlap as in the example of FIG. 8). In some embodiments, at least some of the data channels and some of the control channels share the same TCI state—that is, some of the data and control channels share a beam.

These associations can allow for implicit mapping between the TCI states for the UE-specific channels and the TCI states for the one or more TCI channels, as discussed herein above. For example, the UE can generate a table that maps a given TCI state within set $ND_K$ (of the narrow UE-specific DL channel beams) or within set $NU_M$ (of the narrow UE-specific UL channel beams) to a given TCI state within set $W_N$ (of the TCI channel beams). These tables could then be referenced by the UE to determine which TCI states for TCI channel beams are known to encompass a TCI state for a DL or UL channel beam indicated to the UE by a beam indication. In some embodiments, when the DL and UL channels share beams, only one table is generated which maps TCI states from both sets $ND_K$ and $NU_M$ to set $W_N$. In other embodiments, a DL-TCI table or UL-TCI table which includes a mapping between a reference RS and target RSs and QCL types is extended to include one or more reference RSs for a TCI Channel and corresponding QCL types.

Next, the UE establishes initial TCI states for the data channels and control channels (i.e., UE-specific channels) and an initial TCI state for the channel for conveying TCIs (i.e., TCI channel), and monitors these TCI states for the corresponding channels (step 920). For example, during initial access or during inter-cell mobility, the UE may receive information (such as TCIs) indicating TCI states to use for the UE-specific channels (e.g., TCI state $ND_k$ from the set $ND_K$ for DL channels and TCI state $NU_m$ from the set $NU_M$ for UL channels) and the TCI channel (e.g., TCI state $W_n$ from the set $W_N$). The UE then monitors the indicated TCI channel beam for the TCI channel and uses the indicated UE-specific channel beams to receive or transmit other DL or UL channels.

Next, the UE determines whether one or more TCIs (or TCI state IDs) have been received—that is, whether a TCI channel conveying the TCIs has been successfully received on the current TCI channel beam (step 925). If yes, the UE proceeds to step 930. If not, the UE continues monitoring the TCI channel beam for TCI channels, and continues receiving and transmitting other DL and UL channels on the current UE-specific channel beams.

Next, the UE transmits an acknowledgement message in response to reception of the one or more TCIs on the channel for conveying TCIs (i.e., TCI channel) using a spatial filter based on the current TCI state for the TCI channel (i.e., TCI channel beam) (step 930). For example, as disclosed herein above, this can be a HARQ ACK or a PUCCH transmission. In other embodiments, the UE does not transmit any dedicated acknowledgement signal, and instead the UE transmits other signals that the gNB infers as acknowledgement of reception of the TCI channel.

Next, the UE determines, based on the one or more received TCIs, TCI states for data channels and control channels (i.e., UE-specific channels), respectively, to use as a new TCI state for the UE-specific channels (step 935). For example, as disclosed herein above, the TCIs function as a beam indication that indicate one or both of a new TCI state $ND_k$ of set $ND_K$ DL channel beams or $NU_m$ of set $NU_M$ UL channel beams. The TCI can also be a joint TCI that indicates both the new TCI states $ND_k$ and $NU_m$.

Next, the UE updates one or more spatial filters for the data channels and control channels (i.e., UE-specific channels) based on the determined TCI states for the data channels and the control channels, respectively (step 940). For example, the UE sets the TCI state to be used for the UE-specific channels to the new TCI state or states $ND_k$ and $NU_m$ determined in step 935.

Next, the UE either infers, based on the TCI states for the data channels and control channels (i.e., UE-specific channels) determined at step 935, a TCI state for the channel for conveying the TCIs (i.e., TCI channel) to be used as the new TCI state for the TCI channel, or the UE determines the TCI state to be used as the new TCI state for the TCI channel based on an explicit indication in the one or more TCIs received at step 925 (step 945). For example, as described herein above, the UE can infer a new TCI state $W_n$ of the set $W_N$ for the TCI channel based on the associations generated at step 915.

Alternatively, as disclosed herein above, the UE can determine the new TCI state for the TCI channel based on one of a first MAC CE or first L1 control signaling received at step 925 that includes a TCI explicitly indicating the new TCI state $W_n$ of the set $W_N$ for the TCI channel. In this case, the signaling received at step 925 can also include a second MAC CE or second L1 control that includes TCIs indicating the new TCI states for the UE-specific channels (e.g., new TCI states $ND_k$ and $NU_m$).

In other embodiments, as disclosed herein above, the UE can determine the new TCI state for the TCI channel based on information provided in one of the UE-specific channels. For example, a UE-specific DL channel, such as a PDCCH or PDSCH, can include both UE-specific control information and a TCI explicitly indicating the new TCI state $W_n$ of the set $W_N$ for the TCI channel.

In yet other embodiments, as disclosed herein above, the UE can determine the new TCI state for the TCI channel based on a MAC CE or L1 control signaling that includes multiple TCIs, wherein one of the TCIs explicitly indicates the new TCI state $W_n$ of the set $W_N$ for the TCI channel, and the other one or more TCIs explicitly indicate the one or more TCI states (e.g., $ND_k$ and $NU_m$) for the UE-specific channels.

Next, the UE updates a spatial filter for the channel for conveying the TCIs based on the determined or inferred TCI state for the channel for conveying the TCIs (i.e., TCI channel) (step 950). For example, the UE sets the TCI state to be used for the TCI channel to the new TCI state $W_n$ inferred or determined in step 945.

Next, the UE determines to use the updated spatial filters for the data channels and the control channels (i.e., UE-specific channels) when the first period of time (e.g., $T_1$) has elapsed either after the transmission of the acknowledgement message at step 930 or after the reception of the TCIs at step 925, and determines to use the updated spatial filter for the channel for conveying the TCIs (i.e., TCI channel) when the second period of time (e.g., $T_2$) has elapsed either after the transmission of the acknowledgement message at step 930 or after the reception of the TCI (or the other information used to infer the TCI state) (step 955). That is, the UE determines the timing for applying the new TCI states determined or inferred at steps 935 and 945.

Next, the UE transmits or receives the data channels and the control channels (i.e., UE-specific channels) based on the updated spatial filters for the UE-specific channels, respectively, and the UE receives the channel for conveying the TCIs (i.e., TCI channel) based on updated spatial filter for the TCI channel (step 960). That is, the UE monitors the new TCI states for the TCI channel and UE-specific DL data and control channels, and uses the new TCI state for the UE-specific UL data and control channels for the next receptions or transmissions on those channels. The process can then return to step 925 when new TCIs are received.

FIGS. 10A-10B illustrate an example process 1000 for beam management by a gNB in accordance with various embodiments of the present disclosure. The process begins by the gNB determining and transmitting configuration information for one or more TCI states and corresponding channels, e.g., a channel for conveying TCIs (i.e., TCI channel) and one or more data channels and control channels (i.e., UE-specific channels) (step 1005). The gNB can transmit this configuration information via higher layer signaling (e.g., RRC signaling), a MAC CE, or L1 control signaling. The data channels and the control channels can include one or more UE-specific channels, which can be DL channels and UL channels.

The configuration information can include, for example, a set of TCI states corresponding to $ND_K$ narrow UE-specific DL channel beams (e.g., DL-TCI states), which the gNB may assume are used for PDSCH or PDCCH channels (e.g., data or control channels not for beam indication), a set of TCI states corresponding to $NU_M$ narrow UE-specific UL channel beams (e.g., UL-TCI states) which the gNB may assume are used for uplink channels (e.g., data or control channels such as PUSCH, or PUCCH, or PRACH), and a set of TCI states corresponding to $W_N$ TCI channel beams which the gNB may assume are used for receiving the TCI channel (e.g., the channel for conveying TCIs).

In some cases, narrow DL channel beams and narrow UL channel beams can be from a same set that can be indicated by a joint-TCI. Additionally, the TCI channel beams can be from the same set that is indicated by the joint-TCI. In other embodiments, the narrow DL channel beams and TCI channel beams can be from a same set. The sets $ND_K$, $NU_M$, and $W_N$ can each be UE-specific (i.e., configured for one specific UE), common to a group of UEs within a cell, or common to all UEs within a cell.

Next, the gNB transmits configuration information including a first period of time (e.g., $T_1$ or timeDurationForQCL) and a second period of time (e.g., $T_2$ or timeDurationForQCLForBeamIndication) (step 1010). In some embodiments, the gNB transmits this configuration information using one of higher layer signaling (e.g., RRC signaling), a MAC CE, or L1 control signaling. The gNB may also transmit only the first period of time, in which case the UE can set the second period of time equal to the first period of time (e.g., $T_2=T_1$). The configuration information of step 1010 can also be transmitted in step 1005.

Next, the gNB determines and transmits configurations for associations between the TCI states for the data channels and control channels (i.e., UE-specific channels) and the TCI states for the channels for conveying TCIs (i.e., TCI channels) (step 1015).

These associations can include an association between any one or more of the TCI states for the one or more UE-specific channels and one of the TCI states for the channel for conveying the TCIs—that is, a "one-to-one" association wherein one and only one narrow beam is encompassed by one TCI channel beam (e.g., the narrow beam and the TCI channel beam share a same TCI state and are the same beam). The associations can further include an association between multiple of the TCI states for the one or more UE-specific channels and the one of the TCI states for the channel for conveying the TCIs—that is, a "many-to-one" association wherein multiple narrow beams are encompassed by and associated with one and only one TCI channel beam (as shown in the example of FIG. 7). The associations can also include an association between at least one of the TCI states for the one or more UE-specific channels and multiple of the TCI states for the channel for conveying the TCIs—that is, a "many-to-many" association wherein a TCI channel beam encompasses multiple narrow beams, and a narrow beam is encompassed by more than one TCI channel beam (e.g., the TCI channel beams overlap as in the example of FIG. 8). In some embodiments, at least some of the data channels and some of the control channels share the same TCI state—that is, some of the data and control channels share a beam.

These associations can allow for implicit mapping between the TCI states for the UE-specific channels and the TCI states for the one or more TCI channels, as discussed herein above.

Next, the gNB establishes initial TCI states for the data channels and control channels (i.e., UE-specific channels) and an initial TCI state for the channel for conveying TCIs (i.e., TCI channel), and transmits or receives DL or UL data or control channels using the TCI states for the corresponding UE-specific channels (step 1020). For example, during initial access or during inter-cell mobility, the gNB may transmit information (such as TCIs) indicating TCI states to use for the UE-specific channels (e.g., TCI state $ND_k$ from the set $ND_K$ for DL channels and TCI state $NU_m$ from the set $NU_M$ for UL channels) and the TCI channel (e.g., TCI state $W_n$ from the set $W_N$). The gNB then transmits any DL channels (e.g., PDSCH or PDCCH) based on the indicated UE-specific beam for the DL channel and receives any UL channels (e.g., PUSCH, PUCCH, or PRACH) based on the indicated UE-specific beam for the UL channel.

Next, the gNB determines whether one or more of the TCI states for the data and control channels (i.e., UE-specific channels) or for the channel for conveying the TCIs (i.e., TCI channel) need to be updated (step 1025). The gNB can make this determination based on, for example, measurement reports that the gNB receives from the UE, or based on the gNB's own measurements of transmissions from the UE, as described herein above. If the gNB determines that the beams used for one or more of the UE-specific channels and the TCI channel do not need to be updated (e.g., when channel conditions have not changed to cause the current TCI states to no longer be suitable for their corresponding channels), the gNB continues to use the current TCI states, and continues to check for the need to update the TCI states at step 1025. If the gNB determines that the beams used for one or more of the UE-specific channels and the TCI channel do need to be updated (e.g., when channel conditions have changed to cause the current TCI states to no longer be suitable for their corresponding channels), the process continues to step 1030.

Next, the gNB determines one or more of TCI states for the data channels and control channels (i.e., UE-specific channels) and a TCI state for the channel for conveying TCIs (i.e., TCI channel) as new TCI states for the corresponding channels (step 1030). For example, as disclosed herein above, the gNB can determine based on measured changes in channel condition which TCI state would be suitable as a new TCI state for a given channel.

Next, the gNB generates and transmits one or more TCIs (or TCI state IDs) indicating the determined TCI states for one or more of the data channels and control channels (i.e., UE-specific channels) and the channel for conveying TCIs (i.e., TCI channel) on the TCI channel using the current TCI state for the TCI channel (i.e., TCI channel beam) (step 1035). For example, the TCIs can indicate one or both of a new TCI state $ND_k$ of set $ND_K$ DL channel beams or $NU_m$ of set $NU_M$ UL channel beams. The TCI can also be a joint TCI that indicates both the new TCI states $ND_k$ and $NU_m$. In some cases, the TCIs do not explicitly indicate the TCI state for the TCI channel, and instead imply the TCI state for the TCI channel. For example, as described herein above, the gNB can imply a new TCI state $W_n$ of the set $W_N$ for the TCI channel based on the associations determined at step 1015.

In other cases, the gNB can transmit one of a first MAC CE or first L1 control signaling at step 1035 that includes a TCI explicitly indicating the new TCI state $W_n$ of the set $W_N$ for the TCI channel. In this case, the signaling can also include a second MAC CE or second L1 control that includes TCIs indicating the new TCI states for the UE-specific channels (e.g., new TCI states $ND_k$ and $NU_m$).

In other embodiments, as disclosed herein above, the gNB can provide information in one of the UE-specific channels that indicates the new TCI state for the TCI channel. For example, a UE-specific DL channel, such as a PDCCH, can include both UE-specific control information and a TCI explicitly indicating the new TCI state $W_n$ of the set $W_N$ for the TCI channel.

In yet other embodiments, as disclosed herein above, the gNB can transmit a MAC CE or L1 control signaling that includes multiple TCIs, wherein one of the TCIs explicitly indicates the new TCI state $W_n$ of the set $W_N$ for the TCI channel, and the other one or more TCIs explicitly indicate the one or more TCI states (e.g., $ND_k$ and $NU_m$) for the UE-specific channels.

Next, the gNB receives an acknowledgement message indicating reception of the one or more TCIs on the channel for conveying TCIs (i.e., TCI channel) using a spatial filter based on the current TCI state for the TCI channel (i.e., TCI channel beam) (step 1040). For example, as disclosed herein above, this can be a HARQ ACK or a PUCCH transmission, or the gNB can receive other signals transmitted from the UE that the gNB infers as acknowledgement of reception of the TCI channel.

Next, the gNB determines to use updated spatial filters based on the updated TCI states for the data channels and the control channels (i.e., UE-specific channels) when the first period of time (e.g., $T_1$) has elapsed either after the reception of the acknowledgement message at step 1040 or after the transmission of the TCIs at step 1035, and determines to use an updated spatial filter based on the updated TCI state for the channel for conveying the TCIs (i.e., TCI channel) when the second period of time (e.g., $T_2$) has elapsed either after the reception of the acknowledgement message at step 1040 or after the transmission of the TCI (or the other information used to imply the TCI state) (step 1045). That is, the gNB determines the timing for applying the new TCI states transmitted or implied at step 1035.

Next, the gNB transmits or receives the data channels and the control channels (i.e., UE-specific channels) based on the updated spatial filters for the UE-specific channels, respectively, and the gNB transmits the channel for conveying the TCIs (i.e., TCI channel) based on the updated spatial filter for the TCI channel (step 1050). That is, the gNB monitors the new TCI states for the UE-specific UL data and control channels, and uses the new TCI state for the UE-specific DL data and control channels and TCI channels for the next receptions or transmissions on those channels. The process can then return to step 1025 when the gNB determines that new TCI states are suitable.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
a transceiver configured to:
receive, from a base station, configuration information for one or more transmission configuration indicator (TCI) states,
receive, from the base station, downlink control information (DCI) indicating a TCI state from among the one or more TCI states, and
transmit, to the base station, hybrid automatic repeat request-acknowledgement (HARQ-ACK) information on a physical uplink control channel (PUCCH) in response to the DCI or in response to a physical downlink shared channel (PDSCH) scheduled by the DCI; and
a processor operably coupled to the transceiver, the processor configured to apply the indicated TCI state for receiving a downlink signal or for transmitting an uplink signal, and
wherein, in case that the DCI does not include a downlink assignment, the HARQ-ACK information transmitted to the base station on the PUCCH corresponds to the DCI indicating the TCI state without the downlink assignment.

2. The UE of claim 1, wherein, in case that the DCI includes the downlink assignment, the HARQ-ACK information transmitted to the base station on the PUCCH corresponds to the PDSCH scheduled by the DCI indicating the TCI state.

3. The UE of claim 1, wherein:
in case that the indicated TCI state is different from a previously indicated TCI state, the indicated TCI state is applied after a beam application time from transmitting the HARQ-ACK information on the PUCCH, and
the beam application time is configured by a radio resource control (RRC) signaling.

4. The UE of claim 1, wherein:
the transceiver is further configured to receive, from the base station, a medium access control (MAC) control element (CE) for one or more activated TCI states from among the one or more TCI states, and
the DCI indicates the TCI state from among one or more activated TCI states.

5. A base station in a wireless communication system, the base station comprising:
a transceiver configured to:
transmit, to a user equipment (UE), configuration information for one or more transmission configuration indicator (TCI) states,
transmit, to the UE, downlink control information (DCI) indicating a TCI state from among the one or more TCI states, and
receive, from the UE, hybrid automatic repeat request-acknowledgement (HARQ-ACK) information on a physical uplink control channel (PUCCH) in response to the DCI or in response to a physical downlink shared channel (PDSCH) scheduled by the DCI; and
a processor operably coupled to the transceiver, the processor configured to determine a beam for transmitting a downlink signal or for receiving an uplink signal according to the indicated TCI state, and
wherein, in case that the DCI does not include a downlink assignment, the HARQ-ACK information received from the UE on the PUCCH corresponds to the DCI indicating the TCI state without the downlink assignment.

6. The base station of claim 5, wherein, in case that the DCI includes the downlink assignment, the HARQ-ACK information received from the UE on the PUCCH corresponds to the PDSCH scheduled by the DCI indicating the TCI state.

7. The base station of claim 5, wherein:
in case that the indicated TCI state is different from a previously indicated TCI state, the indicated TCI state is applied after a beam application time from receiving the HARQ-ACK information on the PUCCH, and
the beam application time is configured by a radio resource control (RRC) signaling.

8. The base station of claim 5, wherein:
the transceiver is further configured to transmit, to the UE, a medium access control (MAC) control element (CE) for one or more activated TCI states from among the one or more TCI states, and
the DCI indicates the TCI state from among one or more activated TCI states.

9. A method performed by a user equipment (UE) in a wireless communication system, the method comprising:
receiving, from a base station, configuration information for one or more transmission configuration indicator (TCI) states;
receiving, from the base station, downlink control information (DCI) indicating a TCI state from among the one or more TCI states;
transmitting, to the base station, hybrid automatic repeat request-acknowledgement (HARQ-ACK) information on a physical uplink control channel (PUCCH) in response to the DCI or in response to a physical downlink shared channel (PDSCH) scheduled by the DCI; and applying the indicated TCI state for receiving a downlink signal or for transmitting an uplink signal, and wherein, in case that the DCI does not include a downlink assignment, the HARQ-ACK information transmitted to the base station on the PUCCH corresponds to the DCI indicating the TCI state without the downlink assignment.

10. The method of claim 9, wherein, in case that the DCI includes the downlink assignment, the HARQ-ACK information transmitted to the base station on the PUCCH corresponds to the PDSCH scheduled by the DCI indicating the TCI state.

11. The method of claim 9, wherein:
in case that the indicated TCI state is different from a previously indicated TCI state, the indicated TCI state is applied after a beam application time from transmitting the HARQ-ACK information on the PUCCH, and
the beam application time is configured by a radio resource control (RRC) signaling.

12. The method of claim 9, further comprising:
receiving, from the base station, a medium access control (MAC) control element (CE) for one or more activated TCI states from among the one or more TCI states,
wherein the DCI indicates the TCI state from among one or more activated TCI states.

13. A method performed by a base station in a wireless communication system, the method comprising:
transmitting, to a user equipment (UE), configuration information for one or more transmission configuration indicator (TCI) states;
transmitting, to the UE, downlink control information (DCI) indicating a TCI state from among the one or more TCI states;
receiving, from the UE, hybrid automatic repeat request-acknowledgement (HARQ-ACK) information on a physical uplink control channel (PUCCH) in response to the DCI or in response to a physical downlink shared channel (PDSCH) scheduled by the DCI; and
determining a beam for transmitting a downlink signal or for receiving an uplink signal according to the indicated TCI state, and
wherein, in case that the DCI does not include a downlink assignment, the HARQ-ACK information received from the UE on the PUCCH corresponds to the DCI indicating the TCI state without the downlink assignment.

14. The method of claim 13, wherein, in case that the DCI includes the downlink assignment, the HARQ-ACK information received from the UE on the PUCCH corresponds to the PDSCH scheduled by the DCI indicating the TCI state.

15. The method of claim 13, wherein:
in case that the indicated TCI state is different from a previously indicated TCI state, the indicated TCI state is applied after a beam application time from receiving the HARQ-ACK information on the PUCCH, and
the beam application time is configured by a radio resource control (RRC) signaling.

16. The method of claim 13, further comprising:
transmitting, to the UE, a medium access control (MAC) control element (CE) for one or more activated TCI states from among the one or more TCI states, and
wherein the DCI indicates the TCI state from among one or more activated TCI states.

* * * * *